United States Patent
Hayashi et al.

(10) Patent No.: US 11,120,685 B2
(45) Date of Patent: Sep. 14, 2021

(54) MAP INFORMATION SYSTEM

(71) Applicant: TOYOTA JIDOSHA KABUSHIKI KAISHA, Toyota (JP)

(72) Inventors: Yusuke Hayashi, Susono (JP); Keisuke Hokai, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 167 days.

(21) Appl. No.: 16/592,356

(22) Filed: Oct. 3, 2019

(65) Prior Publication Data

US 2020/0160697 A1 May 21, 2020

(30) Foreign Application Priority Data

Nov. 21, 2018 (JP) .............................. JP2018-218524

(51) Int. Cl.
| | |
|---|---|
| *G08G 1/01* | (2006.01) |
| *G06F 16/23* | (2019.01) |
| *G08G 1/09* | (2006.01) |
| *G06F 16/25* | (2019.01) |
| *G08G 1/0967* | (2006.01) |
| *G01C 21/36* | (2006.01) |

(Continued)

(52) U.S. Cl.
CPC ......... *G08G 1/0141* (2013.01); *G01C 21/367* (2013.01); *G06F 16/23* (2019.01); *G06F 16/25* (2019.01); *G06F 16/29* (2019.01); *G08G 1/091* (2013.01); *G08G 1/0967* (2013.01); *G08G 1/09626* (2013.01)

(58) Field of Classification Search
CPC .. G08G 1/0141; G08G 1/091; G08G 1/09626; G08G 1/0967; G06F 16/23; G06F 16/25; G06F 16/29; G01C 21/367
See application file for complete search history.

(56) References Cited

U.S. PATENT DOCUMENTS

2005/0104745 A1* 5/2005 Bachelder ............... G08G 1/07
340/906
2006/0009188 A1 1/2006 Kubota et al.
(Continued)

FOREIGN PATENT DOCUMENTS

JP 2006-048624 A 2/2006
JP 2013-109625 A 6/2013

*Primary Examiner* — Hussein Elchanti
(74) *Attorney, Agent, or Firm* — Sughrue Mion, PLLC

(57) ABSTRACT

A map information system includes a database management device that manages a map database used for driving support control of a vehicle. The map database includes traffic signal map information that indicates a position of a traffic signal. The traffic signal map information is associated with an evaluation value indicating certainty of the traffic signal map information for each traffic signal. The database management device recognizes a signal indication of the traffic signal at a verification position, based on camera image information indicating an image around the vehicle. The database management device recognizes behavior of the vehicle with respect to the verification position, based on vehicle state information and vehicle position information. Then, the database management device sets the evaluation value regarding the traffic signal at the verification position according to whether or not the behavior of the vehicle is consistent with the signal indication.

9 Claims, 20 Drawing Sheets

(51) Int. Cl.
*G06F 16/29* (2019.01)
*G08G 1/0962* (2006.01)

(56) References Cited

U.S. PATENT DOCUMENTS

| | | | |
|---|---|---|---|
| 2008/0137908 A1* | 6/2008 | Stein | G08G 1/096783 |
| | | | 382/103 |
| 2011/0182475 A1 | 7/2011 | Fairfield et al. | |
| 2015/0154860 A1* | 6/2015 | Holzwanger | G08G 1/0967 |
| | | | 340/944 |
| 2018/0075739 A1* | 3/2018 | Ginsberg | G08G 1/0145 |
| 2018/0257615 A1* | 9/2018 | Rawashdeh | B60T 7/12 |
| 2018/0261083 A1* | 9/2018 | Sun | G08G 1/0112 |
| 2019/0082377 A1* | 3/2019 | Silver | G08G 1/096741 |
| 2019/0122548 A1* | 4/2019 | Sakuma | G08G 1/0145 |
| 2019/0180617 A1* | 6/2019 | Hori | G08G 1/0129 |
| 2019/0188586 A1* | 6/2019 | Rajabizadeh | G06N 3/08 |
| 2019/0272747 A1* | 9/2019 | Raamot | G08G 1/08 |

\* cited by examiner

<TRAFFIC SIGNAL MAP INFORMATION SG_MAP>

| POSITION [X,Y,Z] | EVALUATION VALUE P |
|---|---|
|  |  |
|  |  |
| ⋮ | ⋮ |

*Fig. 2*

<TRAFFIC SIGNAL MAP INFORMATION SG_MAP>

| POSITION [X,Y,Z] | ORIENTATION | EVALUATION VALUE P |
|---|---|---|
|  |  |  |
|  |  |  |
| ... | ... | ... |

*Fig. 17*

<TRAFFIC SIGNAL MAP INFORMATION SG_MAP>

| POSITION [X,Y,Z] | TYPE | EVALUATION VALUE P |
|---|---|---|
|  |  |  |
|  |  |  |
| ... | ... | ... |

*Fig. 19*

MAP INFORMATION SYSTEM

BACKGROUND

Technical Field

The present disclosure relates to a technique that manages map information used for driving support control that supports driving of a vehicle.

Background Art

Patent Literature 1 discloses a traffic information providing system. The traffic information providing system includes an in-vehicle device having a navigation function and a traffic information center that provides a vehicle with traffic information (traffic jam information). The in-vehicle device determines whether or not there is a deviation between actual travel information of the vehicle and the traffic information provided from the traffic information center. When there is the deviation, the in-vehicle device sends deviation information to the traffic information center. The traffic information center updates the traffic information based on the deviation information.

LIST OF RELATED ART

Patent Literature 1: Japanese Unexamined Patent Application Publication No. 2013-109625

SUMMARY

Let us consider driving support control that supports driving of a vehicle. It is conceivable in the driving support control to use traffic signal map information that indicates a position of a traffic signal. However, if low-quality traffic signal map information is used, accuracy of the driving support control may be decreased on the contrary.

An object of the present disclosure is to provide a technique that can increase usefulness of traffic signal map information used for the driving support control.

In an aspect of the present disclosure, a map information system is provided.

The map information system includes a database management device configured to manage a map database used for driving support control that supports driving of a vehicle.

The map database includes traffic signal map information that indicates a position of a traffic signal.

The traffic signal map information is associated with an evaluation value that indicates certainty of the traffic signal map information for each traffic signal.

Driving environment information indicating driving environment for the vehicle includes:
  camera image information indicating an image around the vehicle;
  vehicle position information indicating a position of the vehicle; and
  vehicle state information indicating a state of the vehicle.
The database management device is further configured to:
  recognize a signal indication of the traffic signal at a verification position, based on the camera image information;
  recognize behavior of the vehicle with respect to the verification position, based on the vehicle state information and the vehicle position information; and
  set the evaluation value regarding the traffic signal at the verification position according to whether or not the behavior of the vehicle is consistent with the signal indication.

According to the present disclosure, the traffic signal map information indicating the position of the traffic signal is used for the driving support control. The traffic signal map information is associated with the evaluation value that indicates "certainty" of the traffic signal map information. The evaluation value corresponds to quality of the traffic signal map information. Since the traffic signal map information is associated with the evaluation value, usefulness of the traffic signal map information is increased.

Furthermore, according to the present disclosure, "accuracy of the evaluation value itself" also is increased. More specifically, the signal indication of the traffic signal at the verification position is recognized based on the camera image information. In addition, the behavior of the vehicle with respect to the verification position is recognized based on the vehicle state information and the vehicle position information. Then, the evaluation value regarding the traffic signal at the verification position is set according to whether or not the behavior of the vehicle with respect to the verification position is consistent with the signal indication. It is thus possible to set the evaluation value more accurately. Increase in accuracy of the evaluation value means increase in accuracy and usefulness of the traffic signal map information that is associated with the evaluation value.

BRIEF DESCRIPTION OF DRAWINGS

FIG. 2 is a conceptual diagram for explaining an example of traffic signal map information in the embodiment of the present disclosure;

FIG. 17 is a conceptual diagram for explaining the traffic signal map information in the first modification example of the embodiment of the present disclosure;

FIG. 19 is a conceptual diagram for explaining the traffic signal map information in the second modification example of the embodiment of the present disclosure.

EMBODIMENTS

Embodiments of the present disclosure will be described below with reference to the attached drawings.

1. OUTLINE

1-1. Map Information System

Figure 1:
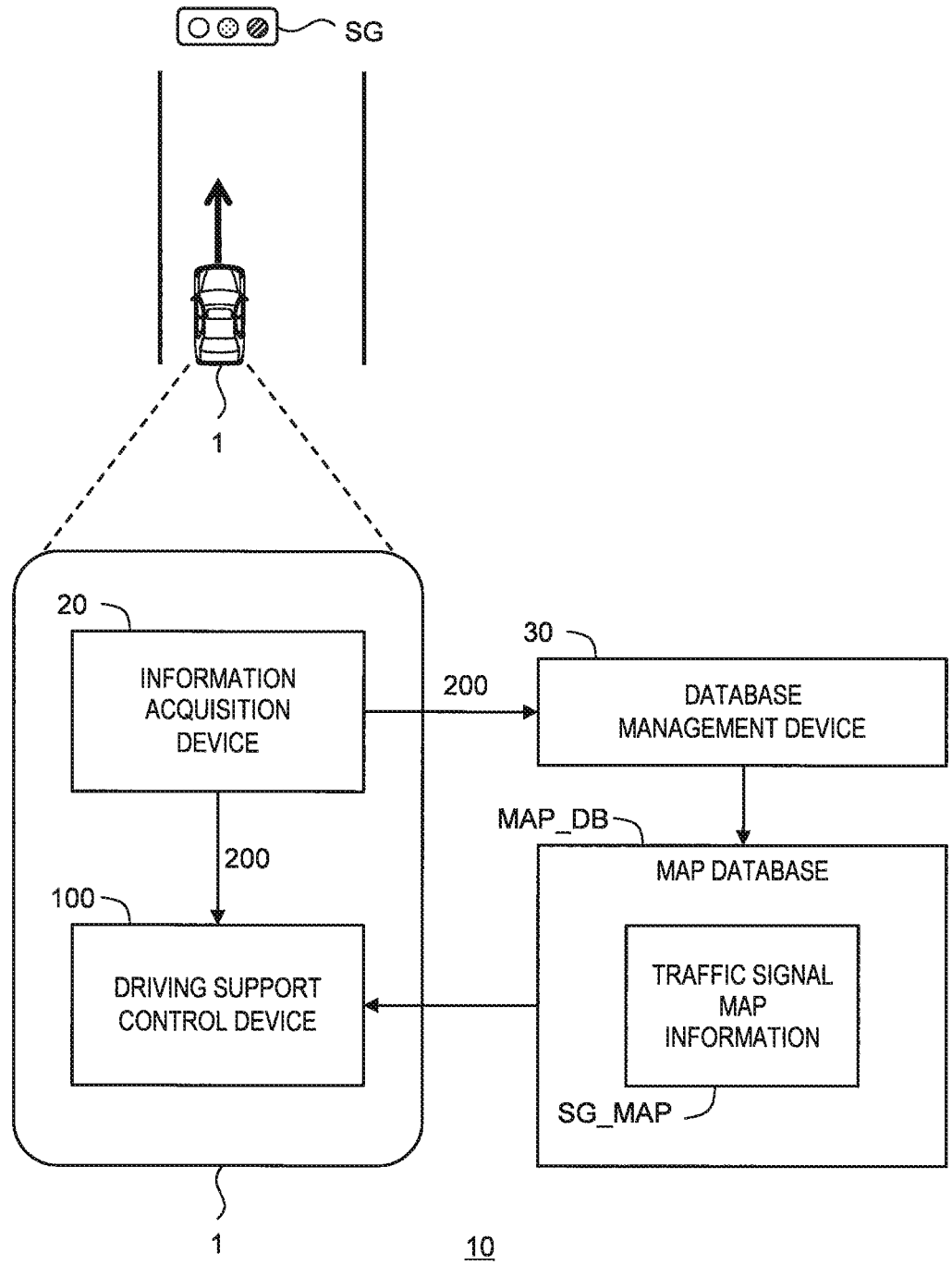
FIG. 1 is a conceptual diagram for explaining an outline of an embodiment of the present disclosure.

FIG. 1 is a conceptual diagram for explaining an outline of the present embodiment. A driving support control device 100 is installed on a vehicle 1. The driving support control device 100 executes driving support control that supports driving of the vehicle 1. Typically, the driving support control includes at least one of steering control, acceleration control, and deceleration control. Such the driving support control is exemplified by automated driving control (autonomous driving control), trajectory-following control (path-following control), lane keep assist control (lane tracing assist control), collision avoidance control, and so forth.

In the driving support control, map information is often used. The map information provides a variety of information associated with a position. Here, the position is an absolute position and is defined in an absolute coordinate system (e.g. latitude, longitude, and altitude). A map database MAP_DB is a set of a variety of map information. It should be noted that the map database MAP_DB may be stored in a memory device of the vehicle 1, or may be stored in an external device outside the vehicle 1.

A map information system 10 according to the present embodiment is a system that manages and utilizes the map database MAP_DB. More specifically, the map information system 10 includes the map database MAP_DB, an information acquisition device 20, and a database management device 30. The map information system 10 may further include the driving support control device 100 that utilizes the map database MAP_DB.

The information acquisition device 20 is installed on the vehicle 1. The information acquisition device 20 uses a sensor installed on the vehicle 1 to acquire a variety of information. Information acquired by the sensor installed on the vehicle 1 indicates driving environment for the vehicle, and such the information is hereinafter referred to as "driving environment information 200". For example, the driving environment information 200 includes vehicle position information indicating a position of the vehicle 1, vehicle state information indicating a state of the vehicle 1, surrounding situation information indicating a situation around the vehicle 1, and so forth. The driving environment information 200 is used for the driving support control by the driving support control device 100 along with the map database MAP_DB. Furthermore, the driving environment information 200 is also used for management of the map database MAP_DB.

The database management device 30 manages the map database MAP_DB used for the driving support control. The management of the map database MAP_DB includes at least one of generation and update of the map database MAP_DB. It should be noted that the database management device 30 may be installed on the vehicle 1, or may be included in an external device outside the vehicle 1. Alternatively, the database management device 30 may be distributed to the vehicle 1 and the external device.

1-2. Traffic Signal Map Information

The map database MAP_DB according to the present embodiment includes "traffic signal map information SG_MAP". The traffic signal map information SG_MAP is map information regarding traffic signals (traffic lights) SG and indicates a position (an absolute position) of each traffic signal SG.

The traffic signal map information SG_MAP is useful in the driving support control. For example, the driving support control device 100 executes signal recognition processing that recognizes a lighting state of a traffic signal SG based on an image imaged by a camera. By referring to the position of the traffic signal SG that is beforehand registered in the traffic signal map information SG_MAP, it is possible to narrow down an image region that should be focused on in the signal recognition processing. This greatly contributes not only to increase in accuracy and stability of the signal recognition processing but also to reduction in amount of computation required for the signal recognition processing.

However, if low-quality traffic signal map information SG_MAP is used, accuracy of the driving support control may be decreased on the contrary. Therefore, it is important in the driving support control to take quality of the traffic signal map information SG_MAP into consideration. In view of the above, the present embodiment introduces a concept of an "evaluation value P" in order to take the quality of the traffic signal map information SG_MAP into consideration.

The evaluation value P indicates "certainty" of the traffic signal map information SG_MAP for each traffic signal SG. The certainty can be reworded as accuracy, reliability, or availability. The evaluation value can be reworded as a score. According to the present embodiment, the traffic signal map information SG_MAP is associated with the evaluation value P.

FIG. 2 is a conceptual diagram for explaining an example of the traffic signal map information SG_MAP in the present embodiment. In the example shown in FIG. 2, the traffic signal map information SG_MAP includes positions (absolute positions [X, Y, Z]) of traffic signals SG and the evaluation values P respectively associated with the traffic signals SG. That is, the position of a certain traffic signal SG and the evaluation value P associated with it constitute one data set.

It can be said that the evaluation value P indicates certainty that the traffic signal SG actually exists at the position indicated by the traffic signal map information SG_MAP. The traffic signal SG at the position is more likely to be recognized accurately as the evaluation value P is higher. Conversely, the traffic signal SG at the position is less likely to be recognized accurately as the evaluation value P is lower. Therefore, preferentially using the traffic signal map information SG_MAP having a higher evaluation value P makes it possible to perform the driving support control with higher accuracy.

As described above, since the traffic signal map information SG_MAP is associated with the evaluation value P, usefulness of the traffic signal map information SG_MAP is increased. By considering the evaluation value P to appropriately use the traffic signal map information SG_MAP, it is possible to increase the accuracy of the driving support control.

It is also important to increase "accuracy of the evaluation value P itself" in order to increase the usefulness of the traffic signal map information SG_MAP and the accuracy of the driving support control. According to the present embodiment, the database management device 30 executes setting of the evaluation value P based on the following point of view in order to increase accuracy of the evaluation value P.

1-3. Setting of Evaluation Value Based on Vehicle Behavior

The above-described driving environment information 200 is used for setting of the evaluation value P. The driving environment information 200 includes the vehicle position information indicating the position of the vehicle 1, the vehicle state information indicating the state of the vehicle 1, the surrounding situation information indicating the situation around the vehicle 1

Figure 3:
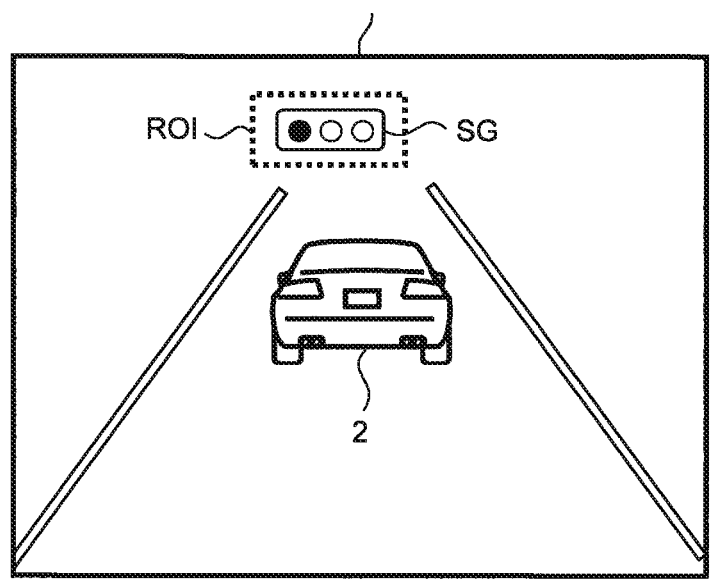
FIG. 3 is a conceptual diagram for explaining camera image information in the embodiment of the present disclosure.

The surrounding situation information includes at least camera image information indicating an image around the vehicle 1. The camera image information is obtained by a camera installed on the vehicle 1. FIG. 3 conceptually shows an example of the camera image information (i.e. an image imaged by the camera). A traffic signal SG and a preceding vehicle 2 ahead of the vehicle 1 are included in the image.

A position of the traffic signal SG being a target of setting of the evaluation value P is hereinafter referred to as a "verification position". The database management device 30 recognizes a signal indication of the traffic signal SG at the verification position based on the camera image information. The signal indication, which is lighting information of the traffic signal SG, includes "Green (Go permitted)", "Red (Stop)", and "Yellow (Others)".

When the signal indication is "Red", the vehicle 1 is supposed to stop before the verification position. On the other hand, when the signal indication is "Green", the vehicle 1 is likely to continue traveling without stopping before the verification position. That is to say, behavior (relative behavior) of the vehicle 1 with respect to the verification position is supposed to be consistent with (conform to) the signal indication.

If the behavior of the vehicle 1 with respect to the verification position is not consistent with the signal indication, it means that the traffic signal SG does not exist at the verification position in reality or the signal indication of the traffic signal SG at the verification position is hard to recognize correctly. In that case, it is preferable that the evaluation value P regarding the traffic signal SG at the verification position is set relatively low.

On the other hand, when the behavior of the vehicle 1 with respect to the verification position is consistent with the signal indication, there is a high possibility that the traffic signal SG actually exists at the verification position. Moreover, there is a high possibility that the signal indication of the traffic signal SG at the verification position is recognized correctly. In that case, it is preferable that the evaluation value P regarding the traffic signal SG at the verification position is set relatively high.

In view of the above, the database management device 30 sets the evaluation value P regarding the traffic signal SG at the verification position according to whether or not the behavior of the vehicle 1 with respect to the verification position is consistent with the signal indication. The behavior of the vehicle 1 with respect to the verification position can be recognized based on the vehicle state information indicating the state of the vehicle 1 and the vehicle position information indicating the position of the vehicle 1.

Every time the vehicle 1 passes a same road, the evaluation value P regarding the same traffic signal SG can be updated. For example, the evaluation value P is given an initial value. It is possible to update the evaluation value P by increasing or decreasing the evaluation value P from a previous value (at first, the initial value).

Figure 4:
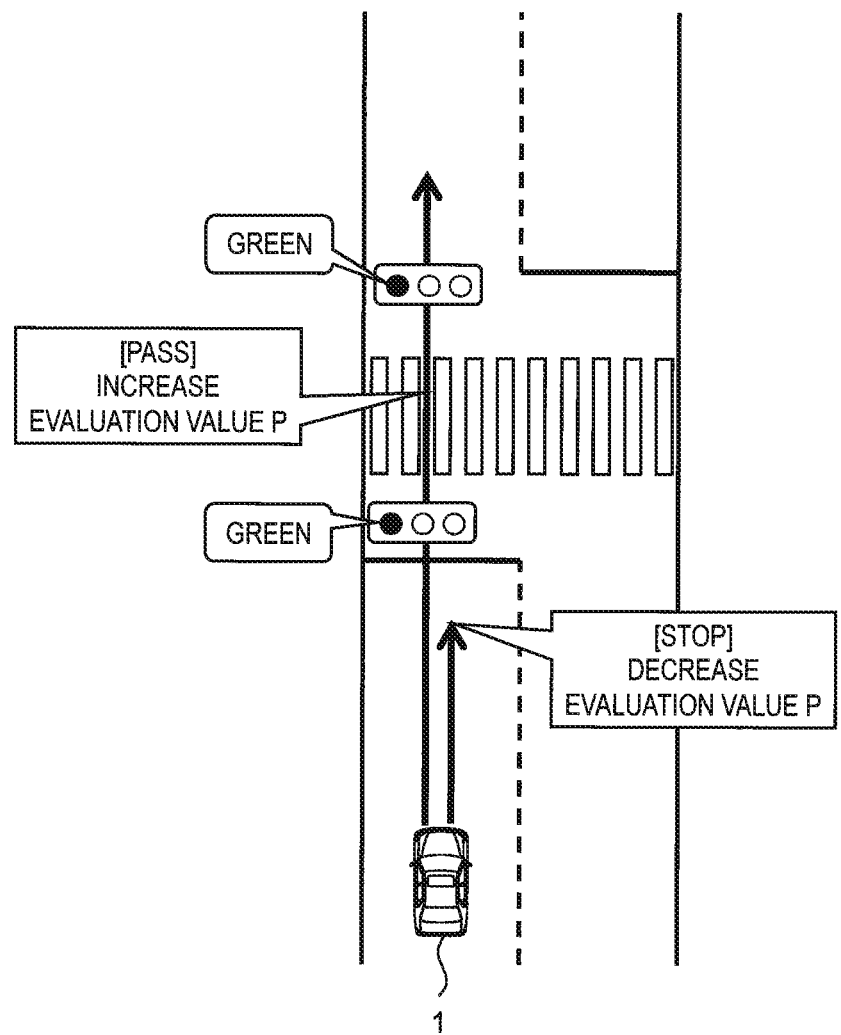
FIG. 4 is a conceptual diagram for explaining an example of setting of an evaluation value by a database management device according to the embodiment of the present disclosure.
Figure 5:
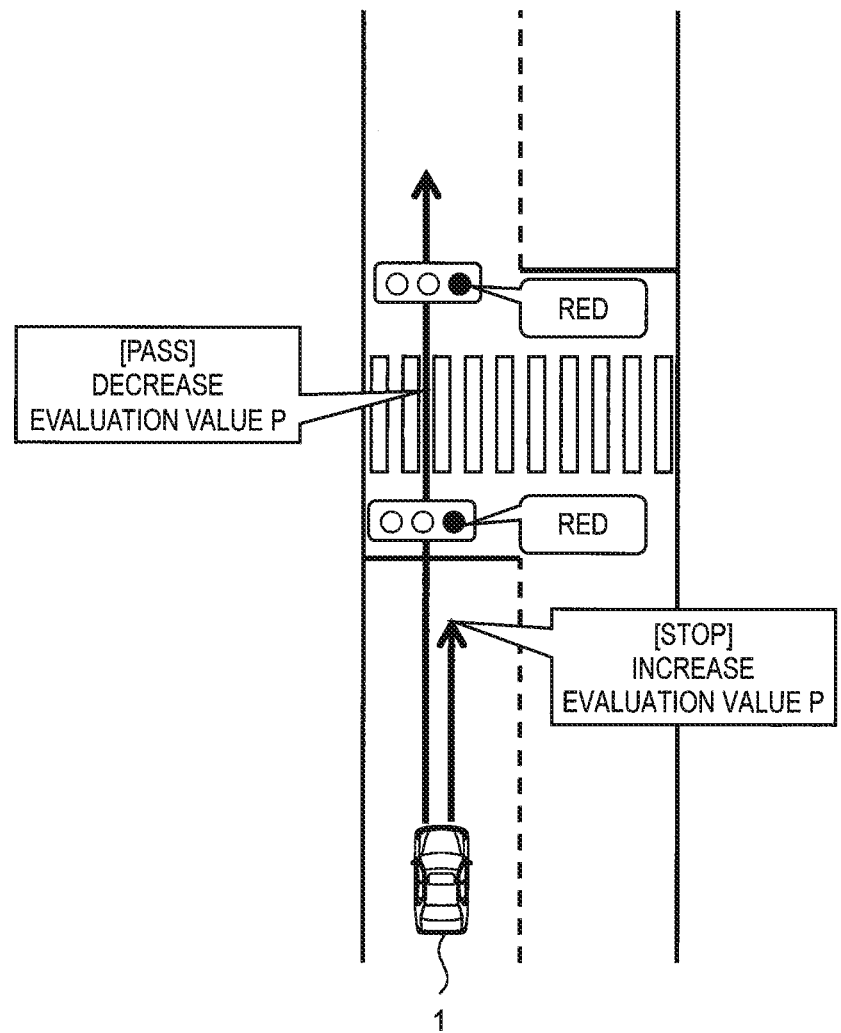
FIG. 5 is a conceptual diagram for explaining another example of setting of the evaluation value by the database management device according to the embodiment of the present disclosure.

FIGS. 4 and 5 show examples of the setting (update) of the evaluation value P. In FIG. 4, the signal indication of the traffic signal SG at the verification position indicates "Go permitted (Green)". When the vehicle 1 passes the verification position without stopping, the behavior of the vehicle 1 is consistent with the signal indication. Therefore, the database management device 30 increases the evaluation value P regarding the traffic signal SG at the verification position from the previous value. On the other hand, when the vehicle 1 stops before the verification position, the behavior of the vehicle 1 is not consistent with the signal indication. Therefore, the database management device 30 decreases the evaluation value P regarding the traffic signal SG at the verification position from the previous value.

In FIG. 5, the signal indication of the traffic signal SG at the verification position indicates "Stop (Red)". When the vehicle 1 stops before the verification position, the behavior of the vehicle 1 is consistent with the signal indication. Therefore, the database management device 30 increases the evaluation value P regarding the traffic signal SG at the verification position from the previous value. On the other hand, when the vehicle 1 passes the verification position without stopping, the behavior of the vehicle 1 is not consistent with the signal indication. Therefore, the database management device 30 decreases the evaluation value P regarding the traffic signal SG at the verification position from the previous value.

Figure 6:
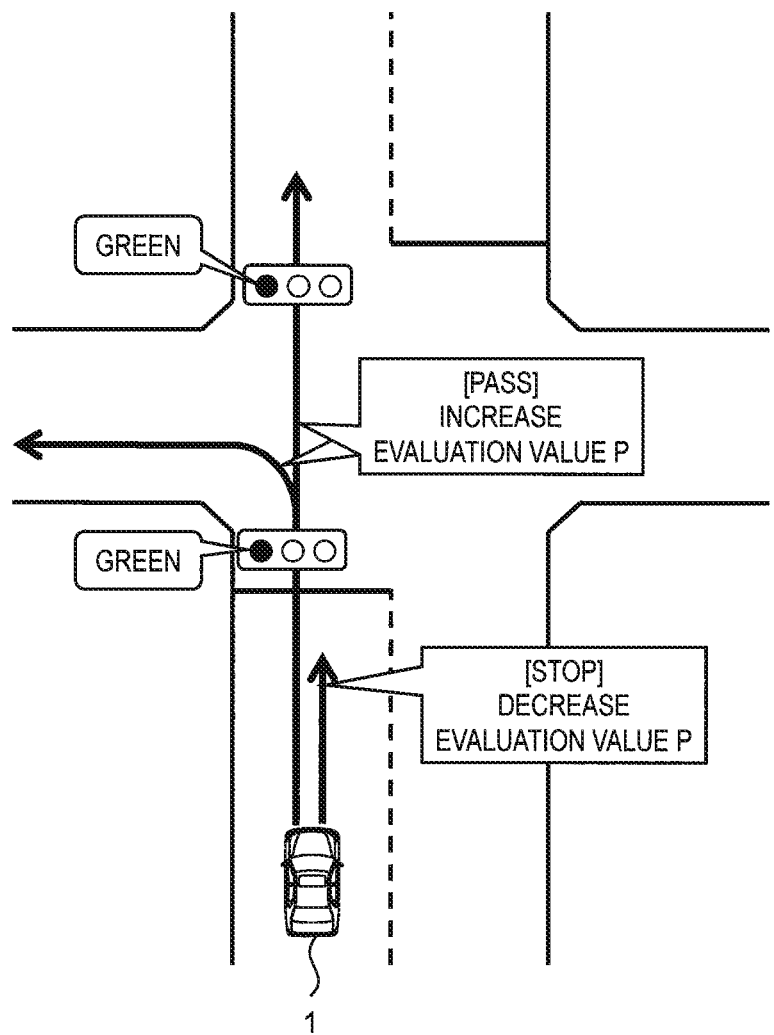
FIG. 6 is a conceptual diagram for explaining still another example of setting of the evaluation value by the database management device according to the embodiment of the present disclosure.
Figure 7:
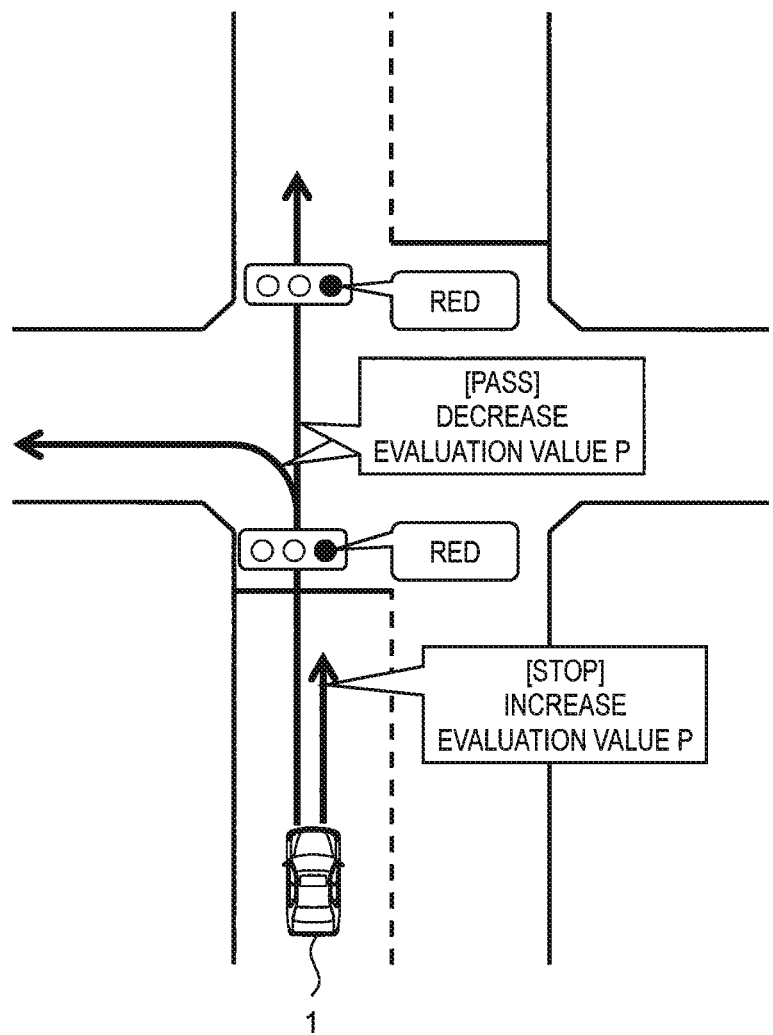
FIG. 7 is a conceptual diagram for explaining still another example of setting of the evaluation value by the database management device according to the embodiment of the present disclosure.

FIGS. 6 and 7 show other examples of the setting (update) of the evaluation value P. In the examples, the traffic signal SG is installed at an intersection. Passing through the intersection means going straight through the intersection, going right at the intersection, or going left at the intersection. Whether or not the vehicle 1 passes through the intersection can be determined based on the behavior of the vehicle 1 with respect to the verification position. Information on an intersection position acquired from commonly-used road map and navigation map may also be used for the determination.

In FIG. 6, the signal indication of the traffic signal SG at the verification position indicates "Go permitted (Green)". When the vehicle 1 passes through the intersection without stopping, the behavior of the vehicle 1 is consistent with the signal indication. Therefore, the database management device 30 increases the evaluation value P regarding the traffic signal SG at the verification position from the previous value. On the other hand, when the vehicle 1 stops before the intersection, the behavior of the vehicle 1 is not consistent with the signal indication. Therefore, the database management device 30 decreases the evaluation value P regarding the traffic signal SG at the verification position from the previous value.

In FIG. 7, the signal indication of the traffic signal SG at the verification position indicates "Stop (Red)". When the vehicle 1 stops before the intersection, the behavior of the vehicle 1 is consistent with the signal indication. Therefore, the database management device 30 increases the evaluation value P regarding the traffic signal SG at the verification position from the previous value. On the other hand, when the vehicle 1 passes through the intersection without stopping, the behavior of the vehicle 1 is not consistent with the signal indication. Therefore, the database management device 30 decreases the evaluation value P regarding the traffic signal SG at the verification position from the previous value.

1-4. Effects

According to the present embodiment, as described above, the traffic signal map information SG_MAP indicating the position of the traffic signal SG is used for the driving support control. The traffic signal map information SG_MAP is associated with the evaluation value P that indicates "certainty" of the traffic signal map information SG_MAP. The evaluation value P corresponds to quality of the traffic signal map information SG_MAP. Since the traffic signal map information SG_MAP is associated with the evaluation value P, usefulness of the traffic signal map information SG_MAP is increased.

For example, preferentially using the traffic signal map information SG_MAP having a higher evaluation value P makes it possible to perform the driving support control with higher accuracy. In other words, by considering the evaluation value P to appropriately use the traffic signal map information SG_MAP, it is possible to increase the accuracy of the driving support control.

Furthermore, according to the present embodiment, "accuracy of the evaluation value P itself" also is increased. More specifically, the signal indication of the traffic signal SG at the verification position is recognized based on the camera image information. In addition, the behavior of the vehicle 1 with respect to the verification position is recognized based on the vehicle state information and the vehicle position information. Then, the evaluation value P regarding the traffic signal SG at the verification position is set according to whether or not the behavior of the vehicle 1 with respect to the verification position is consistent with the signal indication.

As a comparative example, let us consider a case where the evaluation value P is set based only on the signal indication of the traffic signal SG. As shown in FIG. 3, the camera image information (i.e. the image imaged by the camera) includes not only the traffic signal SG but also other objects such as a preceding vehicle 2. Under such a situation, for instance, a brake light of the preceding vehicle 2 may be erroneously recognized as Red light. Therefore, the accuracy of the evaluation value P itself may be decreased in the case of the comparative example.

While on the other hand, according to the present embodiment, the behavior of the vehicle 1 with respect to the verification position also is taken into consideration. More specifically, the evaluation value P regarding the traffic signal SG at the verification position is set according to whether or not the behavior of the vehicle 1 with respect to the verification position is consistent with the signal indication. It is thus possible to set the evaluation value P more accurately. Increase in accuracy of the evaluation value P means increase in accuracy and usefulness of the traffic signal map information SG_MAP that is associated with the evaluation value P.

Since the accuracy of the traffic signal map information SG_MAP is increased, accuracy of the driving support control using the traffic signal map information SG_MAP also is increased. Accordingly, confidence in the driving support control also is increased.

Moreover, every time the vehicle 1 passes a same road, the evaluation value P is updated and the accuracy of the evaluation value P is further increased. That is, the accuracy (quality) and usefulness of the traffic signal map information SG_MAP is further increased. As a result, the accuracy of the driving support control using the traffic signal map information SG_MAP also is further increased.

Furthermore, according to the present embodiment, the setting of the evaluation value P is automatically executed by the database management device 30. As a result, user convenience is increased.

The map database MAP_DB and the database management device 30 may be installed on the vehicle 1. That is to say, all components of the map information system 10 may be installed on the vehicle 1. In that case, the map information system 10 automatically executes, in the vehicle 1, all of the acquisition of the driving environment information 200, the management of the map database MAP_DB based on the driving environment information 200, and the driving support control based on the map database MAP_DB. Such the map information system 10 can be referred to as a "self-learning driving support control system". In particular, when executing the automated driving control as the driving support control, such the map information system 10 can be referred to as a "self-learning automated driving system".

It can be said that the map database MAP_DB is useful knowledge for the driving support control. It can be said that the map information system 10 according to the present embodiment automatically executes detection, verification, and accumulation of the knowledge.

Hereinafter, the map information system 10 according to the present embodiment will be described in more detail.

2. CONFIGURATION EXAMPLE OF MAP INFORMATION SYSTEM 10

2-1. Configuration Example of Driving Support Control Device 100

Figure 8:
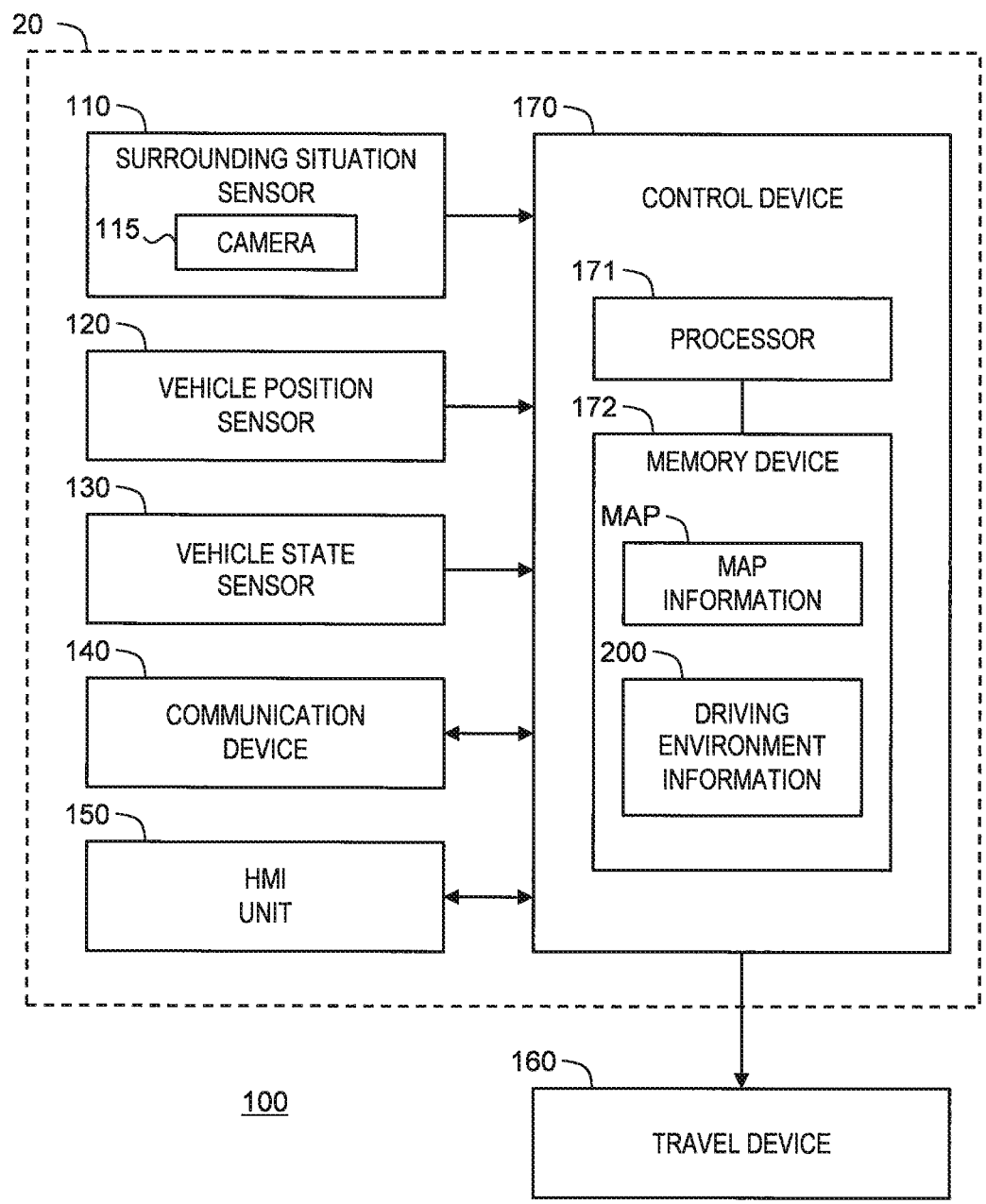
FIG. 8 is a block diagram showing a configuration example of a driving support control device according to the embodiment of the present disclosure.

FIG. 8 is a block diagram showing a configuration example of the driving support control device 100 according to the present embodiment. The driving support control device 100 is installed on the vehicle 1 and includes a surrounding situation sensor 110, a vehicle position sensor 120, a vehicle state sensor 130, a communication device 140, an HMI (Human Machine Interface) unit 150, a travel device 160, and a control device (controller) 170.

The surrounding situation sensor 110 detects (recognizes) a situation around the vehicle 1. The surrounding situation sensor 110 is exemplified by a camera 115 (imaging device), a LIDAR (Laser Imaging Detection and Ranging), a radar, and so forth. The camera 115 images a situation around the vehicle 1. The LIDAR uses laser beams to detect a target around the vehicle 1. The radar uses radio waves to detect a target around the vehicle 1.

The vehicle position sensor 120 detects a position and an orientation (e.g. azimuth) of the vehicle 1. For example, the vehicle position sensor 120 includes a GPS (Global Positioning System) sensor. The GPS sensor receives signals transmitted from a plurality of GPS satellites and calculates the position and the orientation of the vehicle 1 based on the received signals.

The vehicle state sensor 130 detects a state of the vehicle 1. The state of the vehicle 1 includes a speed of the vehicle 1 (i.e. a vehicle speed), an acceleration, a steering angle, a yaw rate, and so forth. The state of the vehicle 1 further includes a driving operation by a driver of the vehicle 1. The driving operation includes an acceleration operation, a braking operation, and a steering operation.

The communication device 140 communicates with the outside of the vehicle 1. For example, the communication device 140 communicates with an external device outside the vehicle 1 through a communication network. The communication device 140 may perform a V2I communication (vehicle-to-infrastructure communication) with a surrounding infrastructure. The communication device 140 may perform a V2V communication (vehicle-to-vehicle communication) with a surrounding vehicle.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like.

The travel device 160 includes a steering device, a driving device, and a braking device. The steering device turns wheels. The driving device is a power source that generates a driving force. The driving device is exemplified by an engine and an electric motor. The braking device generates a braking force.

The control device (controller) 170 is a microcomputer including a processor 171 and a memory device 172. The control device 170 is also called an ECU (Electronic Control Unit). A variety of processing by the control device 170 is achieved by the processor 171 executing a control program stored in the memory device 172.

For example, the control device 170 acquires necessary map information MAP from the map database MAP_DB. The map information MAP includes the traffic signal map information SG_MAP described above. In addition, the map information MAP includes a road map and a navigation map commonly used. In a case where the map database MAP_DB is installed on the vehicle 1, the control device 170 acquires necessary map information MAP from the map database MAP_DB. In another case where the map database MAP_DB exists outside the vehicle 1, the control device 170 acquires necessary map information MAP through the communication device 140. The map information MAP is stored in the memory device 172 and read out from the memory device 172 to be used, as appropriate.

Moreover, the control device 170 acquires the driving environment information 200. The driving environment information 200 is stored in the memory device 172 and read out from the memory device 172 to be used, as appropriate.

Figure 9:
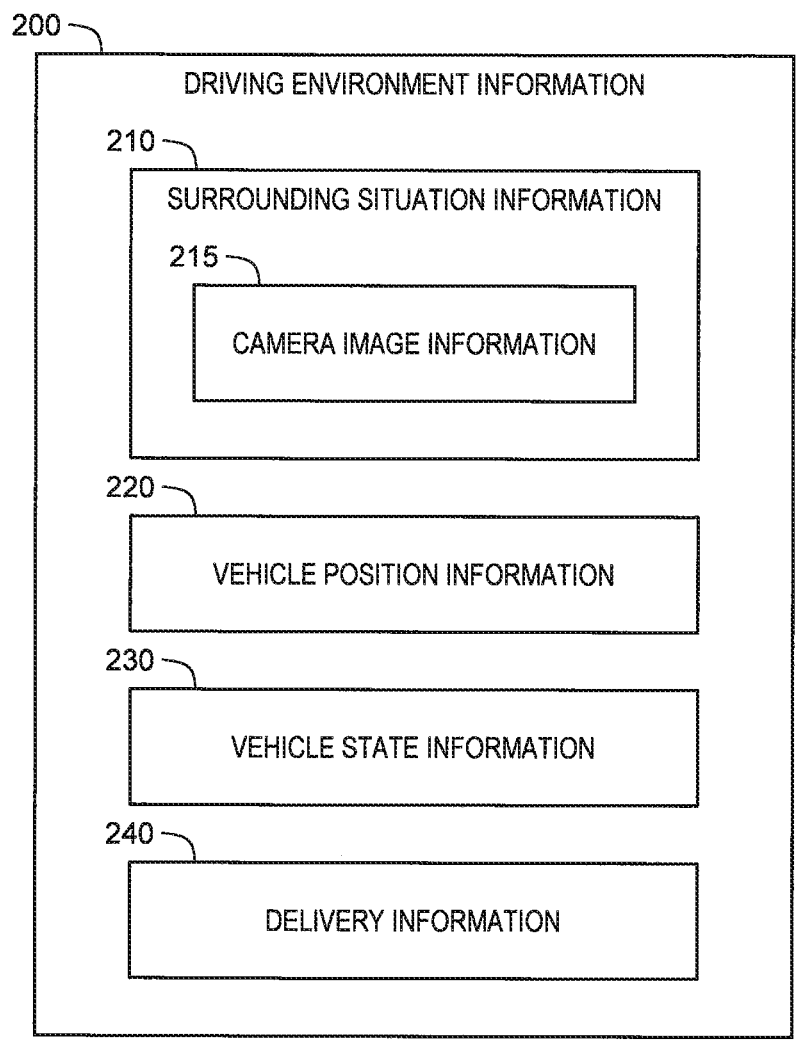
FIG. 9 is a block diagram showing an example of driving environment information used in the embodiment of the present disclosure.

FIG. 9 is a block diagram showing an example of the driving environment information 200. The driving environment information 200 includes surrounding situation information 210, vehicle position information 220, vehicle state information 230, and delivery information 240.

The surrounding situation information 210 indicates the situation around the vehicle 1. The surrounding situation information 210 is information obtained from a result of detection by the surrounding situation sensor 110. For example, the surrounding situation information 210 includes camera image information 215 obtained by the camera 115. The camera image information 215 includes an image around the vehicle 1 imaged by the camera 115. Moreover, the surrounding situation information 210 includes measurement information obtained by the LIDAR and the radar. The surrounding situation information 210 includes target information regarding a target detected based on the camera image information 215 and the measurement information. The target around the vehicle 1 is exemplified by the traffic signal, a surrounding vehicle, a pedestrian, a white line, and so forth. The target information includes a relative position, a relative velocity, and the like of the detected target with respect to the vehicle 1. The control device 170 acquires the surrounding situation information 210 based on the result of detection by the surrounding situation sensor 110.

The vehicle position information 220 indicates the position and the orientation of the vehicle 1. The control device 170 acquires the vehicle position information 220 from the vehicle position sensor 120. Furthermore, the control device 170 may execute a well-known localizing processing by the use of the target information included in the surrounding situation information 210 to increase accuracy of the vehicle position information 220.

The vehicle state information 230 indicates the state of the vehicle 1. The state of the vehicle 1 includes the speed of the vehicle 1 (i.e. the vehicle speed), the acceleration, the steering angle, the yaw rate, and so forth. The state of the vehicle 1 further includes the driving operation by the driver of the vehicle 1. The driving operation includes the acceleration operation, the braking operation, and the steering operation. The control device 170 acquires the vehicle state information 230 from the vehicle state sensor 130. In addition, the driver may indicate acceleration/deceleration of the vehicle 1 by the use of the HMI unit 150. In that case, the control device 170 acquires the vehicle state information 230 from the HMI unit 150.

The delivery information 240 is information acquired through the communication device 140. The control device 170 acquires the delivery information 240 by using the communication device 140 to communicate with the outside of the vehicle 1. For example, the delivery information 240 includes road traffic information (e.g. road work zone information, accident information, traffic restriction information, traffic jam information) delivered from an infrastructure. The delivery information 240 may include information on the surrounding vehicle acquired through the V2V communication.

Furthermore, the control device 170 executes the driving support control based on the map information MAP and the driving environment information 200. The driving support control is exemplified by the automated driving control, the trajectory-following control, the lane keep assist control, the collision avoidance control, and so forth. For the purpose of the driving support control, the control device 170 executes vehicle travel control as appropriate. The vehicle travel control includes steering control, acceleration control, and deceleration control. The control device 170 executes the steering control, the acceleration control, and the deceleration control by appropriately actuating the travel device 160 (i.e. the steering device, the driving device, and the braking device). It can be said that the control device 170 and the travel device 160 constitute a "vehicle travel control device" that executes the vehicle travel control.

As an example of the driving support control, let us consider a case where the control device 170 executes the automated driving control. The control device 170 generates a travel plan for the vehicle 1 based on the map information MAP and the driving environment information 200. The travel plan includes a target route to a destination and a local target trajectory (e.g. a target trajectory within a lane, a target trajectory for a lane change). Moreover, the travel plan includes a vehicle travel control plan for traveling so as to follow the target trajectory, following a traffic rule, avoiding an obstacle, and so forth. The control device 170 executes the vehicle travel control such that the vehicle 1 travels in accordance with the travel plan.

2-2. Configuration Example of Information Acquisition Device 20

The information acquisition device 20 acquires the driving environment information 200. As shown in FIG. 8, the surrounding situation sensor 110, the vehicle position sensor 120, the vehicle state sensor 130, the communication device 140, and the control device 170 constitute the information acquisition device 20.

2-3. Configuration Example of Database Management Device 30

2-3-1. First Configuration Example

Figure 10:
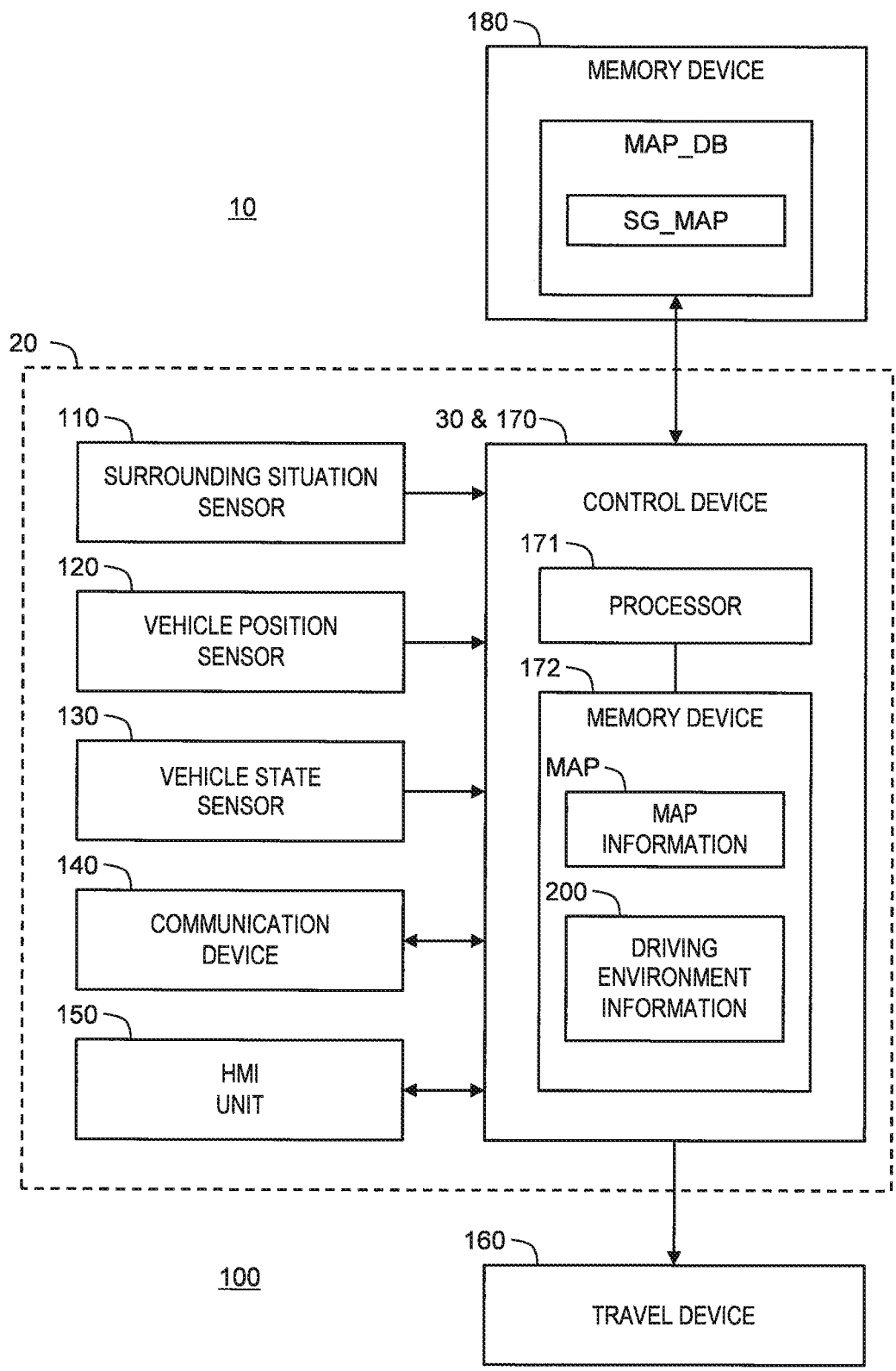
FIG. 10 is a block diagram showing a first configuration example of the database management device according to the embodiment of the present disclosure.

FIG. 10 is a block diagram showing a first configuration example of the database management device 30. In the first configuration example, the map database MAP_DB is installed on the vehicle 1 (the driving support control device 100). More specifically, the map database MAP_DB is stored in a memory device 180. The memory device 180 may be the same as the memory device 172 of the control device 170. The control device 170 (i.e. the processor 171) manages the map database MAP_DB based on the driving environment information 200. That is to say, the control device 170 serves as the database management device 30.

2-3-2. Second Configuration Example

Figure 11:
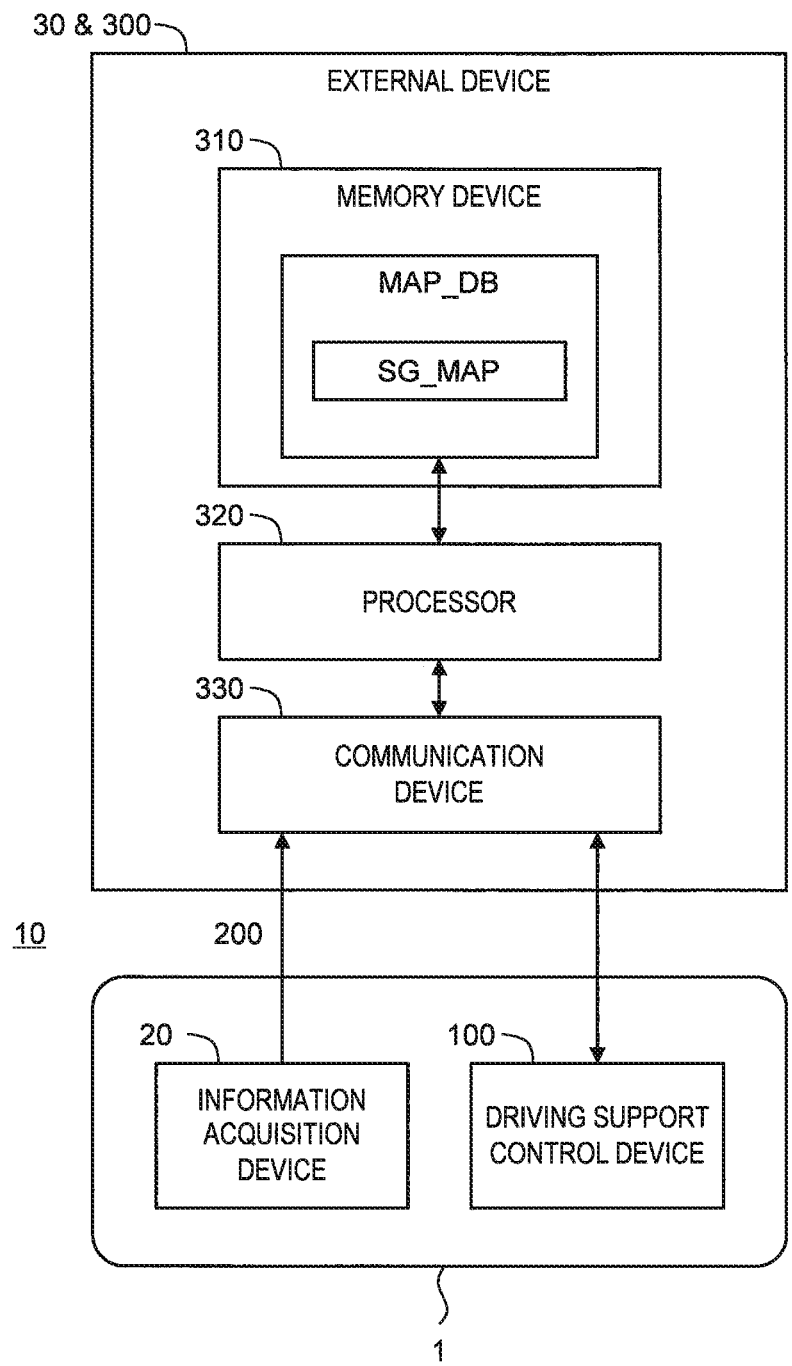
FIG. 11 is a block diagram showing a second configuration example of the database management device according to the embodiment of the present disclosure.

FIG. 11 is a block diagram showing a second configuration example of the database management device 30. In the second configuration example, the database management device 30 is realized by an external device 300 outside the vehicle 1. For example, the external device 300 is a management server.

More specifically, the external device 300 includes a memory device 310, a processor 320, and a communication device 330. The map database MAP_DB is stored in the memory device 310. The communication device 330 communicates with the communication device 140 of the vehicle 1. The processor 320 executes a variety of information processing by executing a computer program stored in the memory device 310.

The information acquisition device 20 (i.e. the control device 170) of the vehicle 1 transmits the driving environment information 200 to the external device 300 through the communication device 140. The processor 320 of the external device 300 receives the driving environment information 200 from the information acquisition device 20 through the communication device 330. Then, the processor 320 manages the map database MAP_DB based on the driving environment information 200.

Moreover, the driving support control device 100 (i.e. the control device 170) of the vehicle 1 sends a request for provision of necessary map information MAP to the external device 300 through the communication device 140. The processor 320 of the external device 300 reads the necessary map information MAP from the map database MAP_DB. Then, the processor 320 provides the map information MAP to the driving support control device 100 through the communication device 330.

2-3-3. Third Configuration Example

Figure 12:
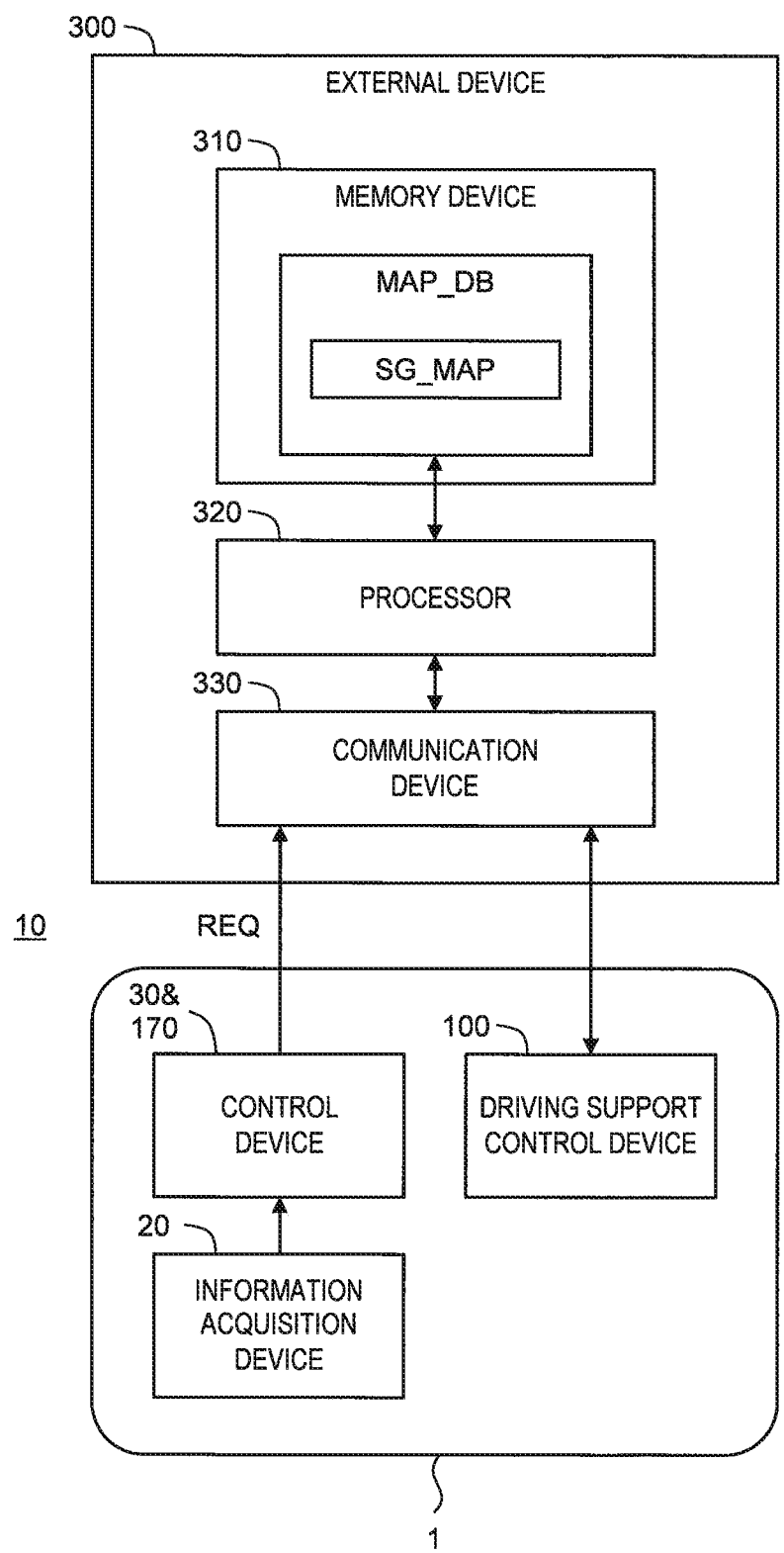
FIG. 12 is a block diagram showing a third configuration example of the database management device according to the embodiment of the present disclosure.

FIG. 12 is a block diagram showing a third configuration example of the database management device 30. In the third configuration example, the map database MAP_DB is stored in the external device 300, as in the case of the second configuration example. Meanwhile, the database management device 30 is realized by the control device 170 of the vehicle 1. That is, the control device 170 (i.e. the processor 171) remotely manipulates the map database MAP_DB on the side of the external device 300.

More specifically, the control device 170 acquires the driving environment information 200 from the information acquisition device 20. Based on the driving environment information 200, the control device 170 executes processing such as setting the evaluation value P. When performing registration or update of the traffic signal map information SG_MAP, the control device 170 transmits a request signal REQ requesting for registration or update to the external device 300 through the communication device 140. The request signal REQ includes information necessary for the registration or the update. The processor 320 of the external device 300 receives the request signal REQ through the communication device 330. Then, the processor 320 performs the registration or the update of the traffic signal map information SG_MAP in accordance with the request signal REQ.

2-3-4. Fourth Configuration Example

The functions of the database management device 30 may be distributed to the control device 170 (i.e. the processor 171) of the vehicle 1 and the processor 320 of the external device 300.

It is possible to summarize the first to fourth configuration examples as follows. That is, one processor (i.e. the processor 171 or the processor 320) or multiple processors (i.e. the processor 171 and the processor 320) serve as the database management device 30.

3. EVALUATION VALUE SETTING PROCESSING

Figure 13:
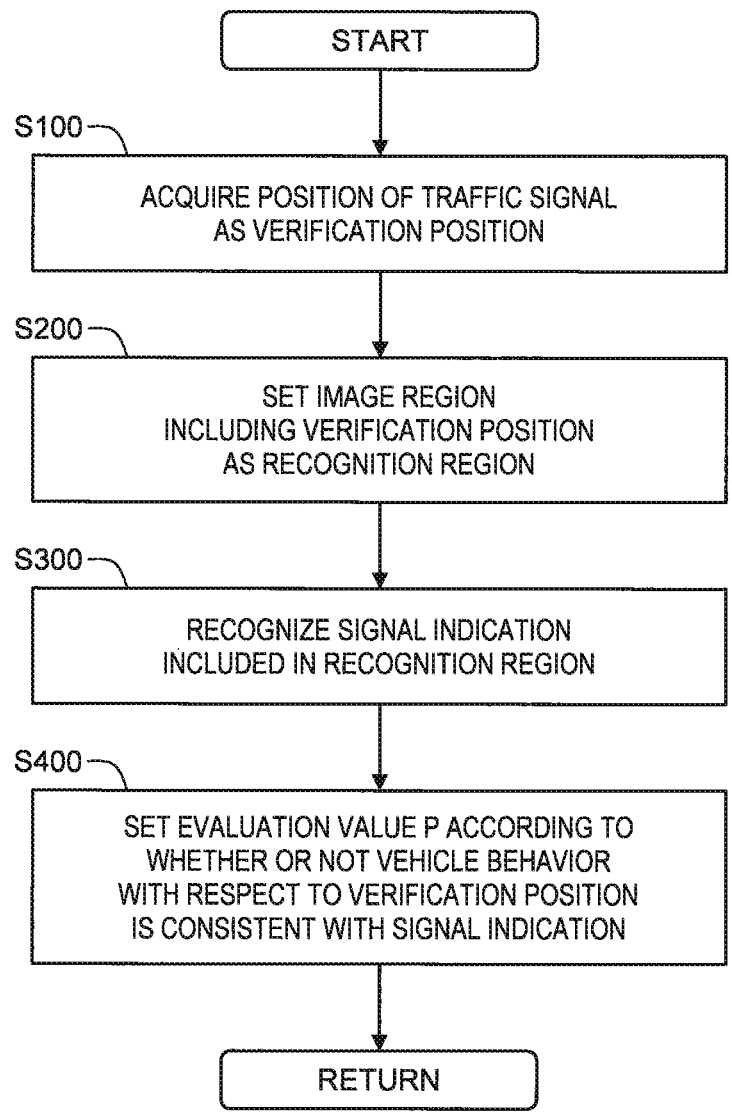
FIG. 13 is a flow chart showing evaluation value setting processing by the database management device according to the embodiment of the present disclosure.

FIG. 13 is a flow chart showing evaluation value setting processing by the database management device 30 according to the present embodiment. For example, the evaluation value setting processing is executed based on the driving environment information 200 that is acquired when the driver performs manual driving.

3-1. Step S100

The database management device 30 acquires the "verification position" that is a position of a traffic signal SG being a target of setting of the evaluation value P.

For example, the database management device 30 detects the traffic signal SG based on the camera image information 215. It is possible to detect the traffic signal SG by analyzing the image imaged by the camera by a publicly-known method. Furthermore, the database management device 30 acquires a detected position (absolute position) of the traffic signal SG based on the camera image information 215 and the vehicle position information 220. For example, a data set including the camera image information 215 and the vehicle position information 220 is repeatedly acquired for a certain period of time. Then, a plurality of data sets are combined with each other to determine the detected position of the traffic signal SG. The detected position of the traffic signal SG is used as the verification position.

As another example, when updating the evaluation value P of the traffic signal map information SG_MAP that is already registered in the map database MAP_DB, the following processing is executed. That is, the database management device 30 acquires the position (absolute position) of the traffic signal SG indicated by the traffic signal map information SG_MAP, as the verification position.

3-2. Step S200

Subsequently, the database management device 30 sets a "recognition region ROI" as shown in FIG. 3. The recognition region ROI, which is a region in the image indicated by the camera image information 215, is a region including the above-described verification position. Based on the camera image information 215, the verification position, and the vehicle position information 220, the database management device 30 sets an image region including the verification position as the recognition region ROI. It should be noted that in some cases, a plurality of recognition regions ROI are included in a single image.

3-3. Step S300

Subsequently, the database management device 30 recognizes the signal indication included in the recognition region ROI, based on the camera image information 215. The processing of recognizing the signal indication is executed for each recognition region ROI. The signal indication, which is lighting information of the traffic signal SG, includes "Green (Go permitted)", "Red (Stop)", and "Yellow (Others)". It is possible to recognize the signal indication by analyzing the image imaged by the camera by a publicly-known method.

3-4. Step S400

Subsequently, the database management device 30 sets the evaluation value P regarding the traffic signal SG at the verification position. The database management device 30 sets the evaluation value P according to whether or not the behavior of the vehicle 1 with respect to the verification position is consistent with the signal indication recognized in Step S300.

Figure 14:
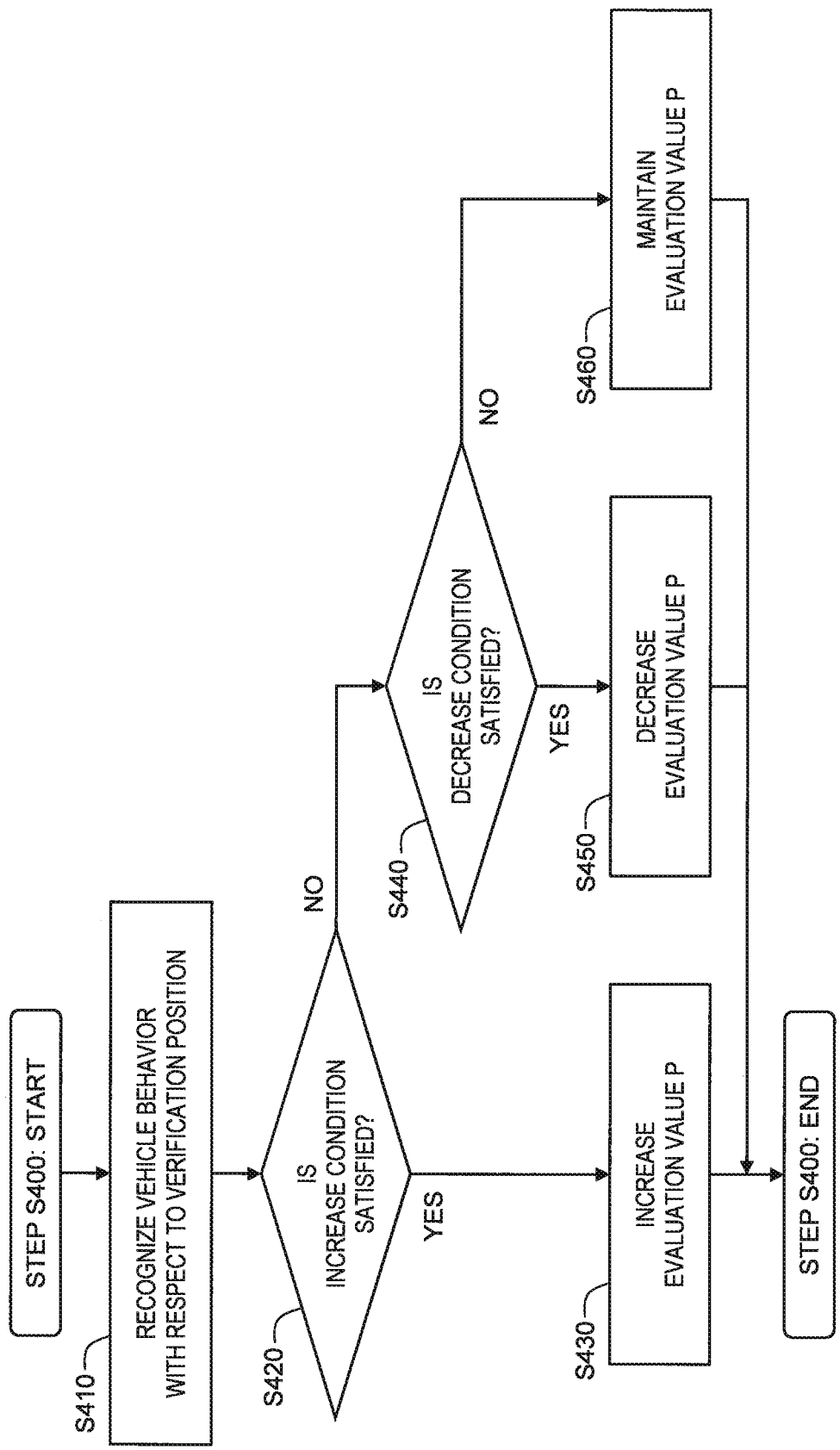
FIG. 14 is a flow chart showing an example of Step S400 in FIG. 13.

FIG. 14 is a flow chart showing an example of Step S400. In the example shown in FIG. 14, the evaluation value P is given an initial value. It is possible to update the evaluation value P by increasing or decreasing the evaluation value P from a previous value (at first, the initial value).

In Step S410, the database management device 30 recognizes the behavior of the vehicle 1 with respect to the verification position, based on the vehicle position information 220 and the vehicle state information 230. As described above, the vehicle state information 230 indicates the speed, the acceleration, the steering angle and so forth of the vehicle 1, and the driving operation (the acceleration operation, the braking operation, the steering operation, and the HMI operation) by the driver. It is therefore possible to recognize the behavior (passing, stopping, or turning to the right/left) of the vehicle 1 with respect to the verification position based on the vehicle state information 230 and the vehicle position information 220.

In Step S420, the database management device 30 determines whether or not an "increase condition" is satisfied. The increase condition is that the behavior of the vehicle 1 with respect to the verification position is consistent with the signal indication of the traffic signal SG at the verification position. Concrete examples of the increase condition are as follows.

[First example] The signal indication of the traffic signal SG indicates "Go permitted (Green)" and the vehicle 1 passes the verification position (see FIG. 4).

[Second example] The signal indication of the traffic signal SG indicates "Stop (Red)" and the vehicle 1 stops before the verification position (see FIG. 5).

[Third example] The signal indication of the traffic signal SG indicates "Go permitted (Green)" and the vehicle 1 passes through the intersection (see FIG. 6).

[Fourth example] The signal indication of the traffic signal SG indicates "Stop (Red)" and the vehicle 1 stops before the intersection (see FIG. 7).

Passing through the intersection means going straight through the intersection, going right at the intersection, or going left at the intersection. Whether or not the vehicle 1 passes through the intersection can be determined based on the behavior of the vehicle 1 with respect to the verification position. Information on an intersection position acquired from usual map information MAP (e.g. the road map, the navigation map) may also be used for the determination.

When any increase condition is satisfied (Step S420; Yes), the processing proceeds to Step S430. In Step S430, the database management device 30 increases the evaluation value P regarding the traffic signal SG at the verification position from the previous value. On the other hand, when no increase condition is satisfied (Step S420; No), the processing proceeds to Step S440.

In Step S440, the database management device 30 determines whether or not a "decrease condition" is satisfied. The decrease condition is that the behavior of the vehicle 1 with respect to the verification position is not consistent with the signal indication of the traffic signal SG at the verification position. Concrete examples of the decrease condition are as follows.

[First example] The signal indication of the traffic signal SG indicates "Go permitted (Green)" and the vehicle 1 stops before the verification position (see FIG. 4).

[Second example] The signal indication of the traffic signal SG indicates "Stop (Red)" and the vehicle 1 passes the verification position (see FIG. 5).

[Third example] The signal indication of the traffic signal SG indicates "Go permitted (Green)" and the vehicle 1 stops before the intersection (see FIG. 6).

[Fourth example] The signal indication of the traffic signal SG indicates "Stop (Red)" and the vehicle 1 passes through the intersection (see FIG. 7).

When any decrease condition is satisfied (Step S440; Yes), the processing proceeds to Step S450. In Step S450, the database management device 30 decreases the evaluation value P regarding the traffic signal SG at the verification position from the previous value. On the other hand, no decrease condition is satisfied (Step S440; No), the processing proceeds to Step S460.

In Step S460, the database management device 30 maintains the evaluation value P regarding the traffic signal SG at the verification position without change. This corresponds to a case where the signal indication of the traffic signal SG is "Yellow", for example.

4. DATABASE GENERATION PROCESSING

Figure 15:
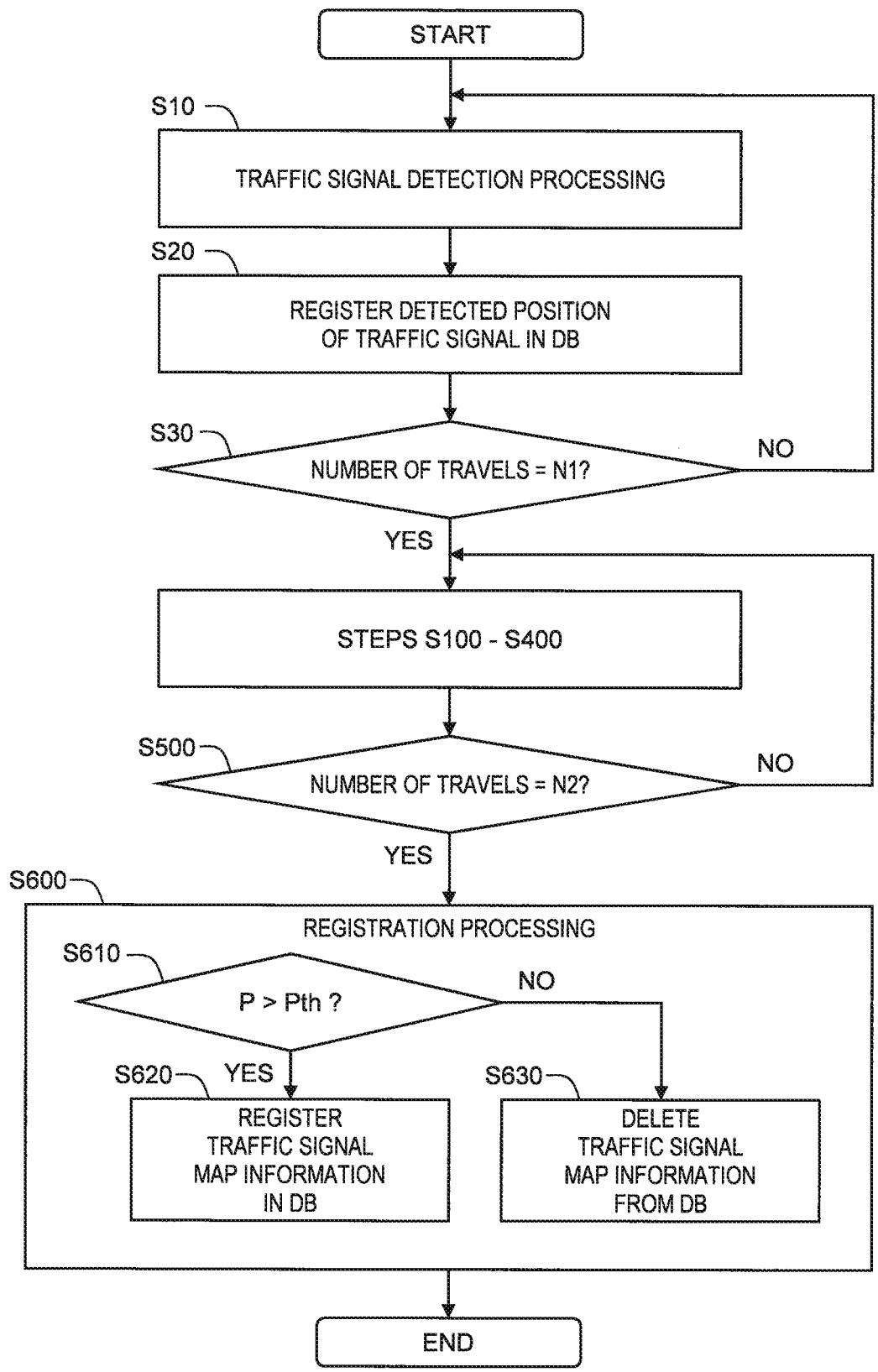
FIG. 15 is a flow chart showing an example of database generation processing by the database management device according to the embodiment of the present disclosure.

FIG. 15 is a flow chart showing an example of database generation processing by the database management device 30 according to the present embodiment. For example, the database generation processing is executed based on the driving environment information 200 that is acquired when the driver performs manual driving. It should be noted that the vehicle 1 repeatedly travels in a same road.

In Step S10, the database management device 30 detects the traffic signal SG based on the camera image information 215. Furthermore, the database management device 30 acquires a detected position (absolute position) of the traffic signal SG based on the camera image information 215 and the vehicle position information 220. For example, a data set including the camera image information 215 and the vehicle position information 220 is repeatedly acquired for a certain period of time. Then, a plurality of data sets are combined with each other to determine the detected position of the traffic signal SG.

In Step S20, the database management device 30 registers the traffic signal map information SG_MAP indicating the detected position of the traffic signal SG in the map database MAP_DB. Here, the evaluation value P of the traffic signal map information SG_MAP is set to a predetermined initial value.

When the number of travels is less than a first predetermined number of times N1 (Step S30; No), the processing returns back to Step S10. That is, Steps S10 and S20 are repeatedly executed until the number of travels reaches the first predetermined number of times N1. When the number of travels reaches the first predetermined number of times N1 (Step S30; Yes), the processing proceeds to Steps S100 to S400 (see FIG. 13).

The database management device 30 repeatedly executes the above-described Steps S100 to S400 until the number of travels reaches a second predetermined number of times N2 (>N1). In other words, the database management device 30 repeatedly calculates and updates the evaluation value P regarding the same traffic signal SG a certain number of times. In Step S100, the database management device 30 acquires the position of the traffic signal SG indicated by the traffic signal map information SG_MAP, as the verification position. When the number of travels reaches the second predetermined number of times N2 (Step S500; Yes), the processing proceeds to Step S600.

In Step S600, the database management device 30 executes the following registration processing for each traffic signal SG (i.e. for each verification position).

In Step S610, the database management device 30 compares the evaluation value P with a threshold Pth. When the evaluation value P is higher than the threshold Pth (Step S610; Yes), the processing proceeds to Step S620. Otherwise (Step S610; No), the processing proceeds to Step S630.

In Step S620, the database management device 30 registers the traffic signal map information SG_MAP regarding the traffic signal SG in the map database MAP_DB while associating the traffic signal map information SG_MAP with the evaluation value P. On the other hand, in Step S630, the database management device 30 deletes the traffic signal map information SG_MAP regarding the traffic signal SG from the map database MAP_DB.

Due to the method described above, the traffic signal map information SG_MAP having relatively high evaluation value P is selectively registered in the map database MAP_DB. This also contributes to increase in accuracy and usefulness of the traffic signal map information SG_MAP.

5. MODIFICATION EXAMPLES

5-1. First Modification Example

Figure 16:
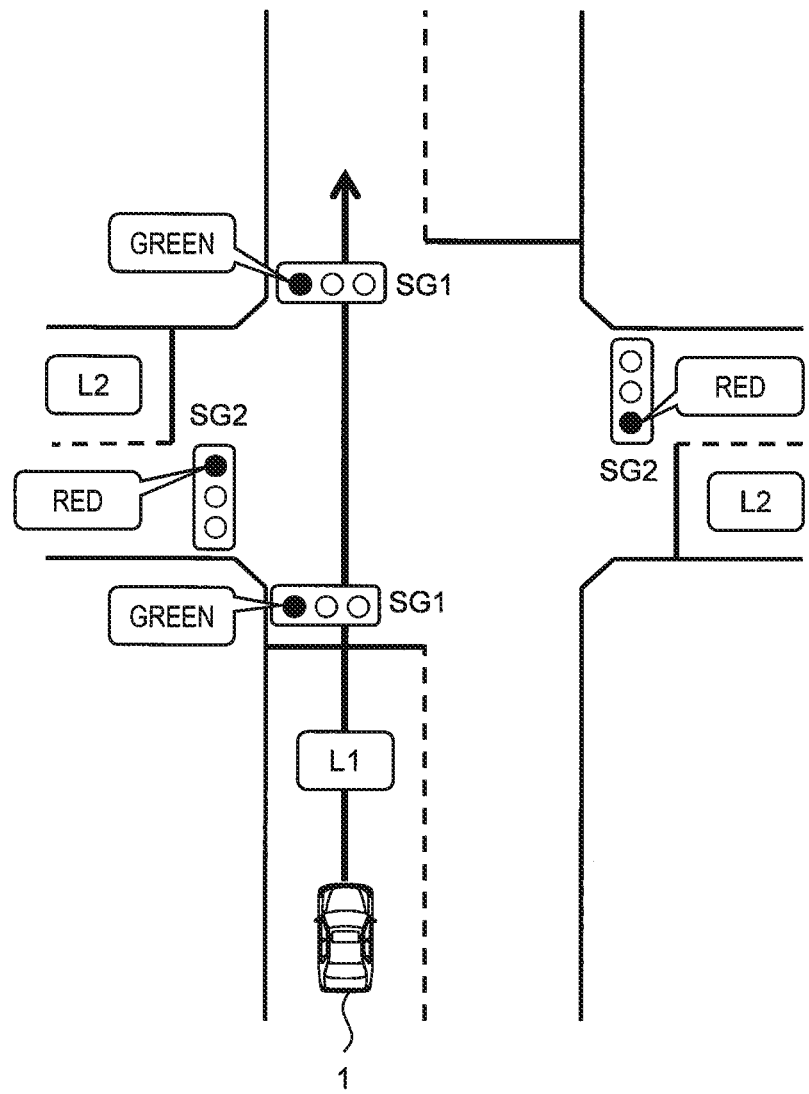
FIG. 16 is a conceptual diagram for explaining a first modification example of the embodiment of the present disclosure.

FIG. 16 is a conceptual diagram for explaining a first modification example of the present embodiment. In the first modification example, we consider a traffic signal SG for a lane intersecting with a travel lane in which the vehicle 1 exists. In the example shown in FIG. 16, the vehicle 1 exists in a first lane L1. The first lane L1 and a second lane L2 intersect with each other at an intersection. A first traffic signal SG1 and a second traffic signal SG2 are installed at the intersection. The first traffic signal SG1 is a traffic signal SG for the first lane L1 and corresponds to the traffic signal SG described in the foregoing embodiment. On the other hand, the second traffic signal SG2 is a traffic signal for the second lane L2.

The database management device 30 determines whether the traffic signal SG at the verification position is the first traffic signal SG1 or the second traffic signal SG2 based on the vehicle position information 220 and an "orientation" of the traffic signal SG at the verification position. Typically, the orientation of the traffic signal SG is defined by a direction (orientation) of its signal indication surface. In the above-described Step S300, the database management device 30 can recognize, based on the camera image information 215, the orientation of the traffic signal SG (the signal indication surface) included in the recognition region ROI.

As another example, the traffic signal map information SG_MAP may include the orientation of the traffic signal SG as shown in FIG. 17. The orientation of the traffic signal SG is defined by a direction (orientation) of its signal indication surface. Alternatively, the orientation of the traffic signal SG may be defined by a lane whose traffic must follow the traffic signal SG. The database management device 30 registers the traffic signal map information SG_MAP indicating the position and orientation of the recognized traffic signal SG in the map database MAP_DB. Thereafter, the database management device 30 can recognize the orientation of the registered traffic signal SG by reference to the traffic signal map information SG_MAP.

In Step S300 (see FIG. 13), the database management device 30 recognizes the signal indication of each of the first traffic signal SG1 and the second traffic signal SG2.

In Step S400, the database management device 30 sets the evaluation value P for each of the first traffic signal SG1 and the second traffic signal SG2. In each case, the evaluation value P is set according to whether or not the behavior of the vehicle 1 is consistent with the signal indication. It should be noted that the increase condition and the decrease condition for the second traffic signal SG2 are directly opposite to those for the first traffic signal SG1. The increase condition and the decrease condition regarding the first traffic signal SG1 are the same as those described in the foregoing embodiment. Concrete examples of the increase condition and the decrease condition regarding the second traffic signal SG2 are as follows.

[First example of increase condition] The signal indication of the second traffic signal SG2 indicates "Go permitted (Green)" and the vehicle 1 stops before the intersection.

[Second example of increase condition] The signal indication of the second traffic signal SG2 indicates "Stop (Red)" and the vehicle 1 passes through the intersection (see FIG. 16).

[First example of decrease condition] The signal indication of the second traffic signal SG2 indicates "Go permitted (Green)" and the vehicle 1 passes through the intersection.

[Second example of decrease condition] The signal indication of the second traffic signal SG2 indicates "Stop (Red)" and the vehicle 1 stops before the intersection.

As another example, the evaluation value P may be set according to whether or not the signal indication of the first traffic signal SG1 and the signal indication of the second traffic signal SG2 are consistent with each other.

[Third example of increase condition] The signal indication of the first traffic signal SG1 indicates "Go permitted (Green)" and the signal indication of the second traffic signal SG2 indicates "Stop (Red)".

[Fourth example of increase condition] The signal indication of the first traffic signal SG1 indicates "Stop (Red)" and the signal indication of the second traffic signal SG2 indicates "Go permitted (Green)".

[Third example of decrease condition] The signal indication of the first traffic signal SG1 indicates "Go permitted (Green)" and the signal indication of the second traffic signal SG2 indicates "Go permitted (Green)".

[Fourth example of decrease condition] The signal indication of the first traffic signal SG1 indicates "Stop (Red)" and the signal indication of the second traffic signal SG2 indicates "Stop (Red)".

Uses of the second traffic signal SG2 in the driving support control are as follows. For example, the driving support control device 100 determines whether or not to go into the intersection in consideration of both of the lighting state of the first traffic signal SG1 and the lighting state of the second traffic signal SG2. As a result, the accuracy of the driving support control is further increased. As another example, let us consider a case where the first traffic signal SG1 is shielded by an obstacle (e.g. a tree, another vehicle, etc.) and cannot be seen from the vehicle 1. In that case, the driving support control device 100 determines whether or not to stop the vehicle 1 by using the lighting state of the second traffic signal SG2 as reference.

5-2. Second Modification Example

Figure 18:
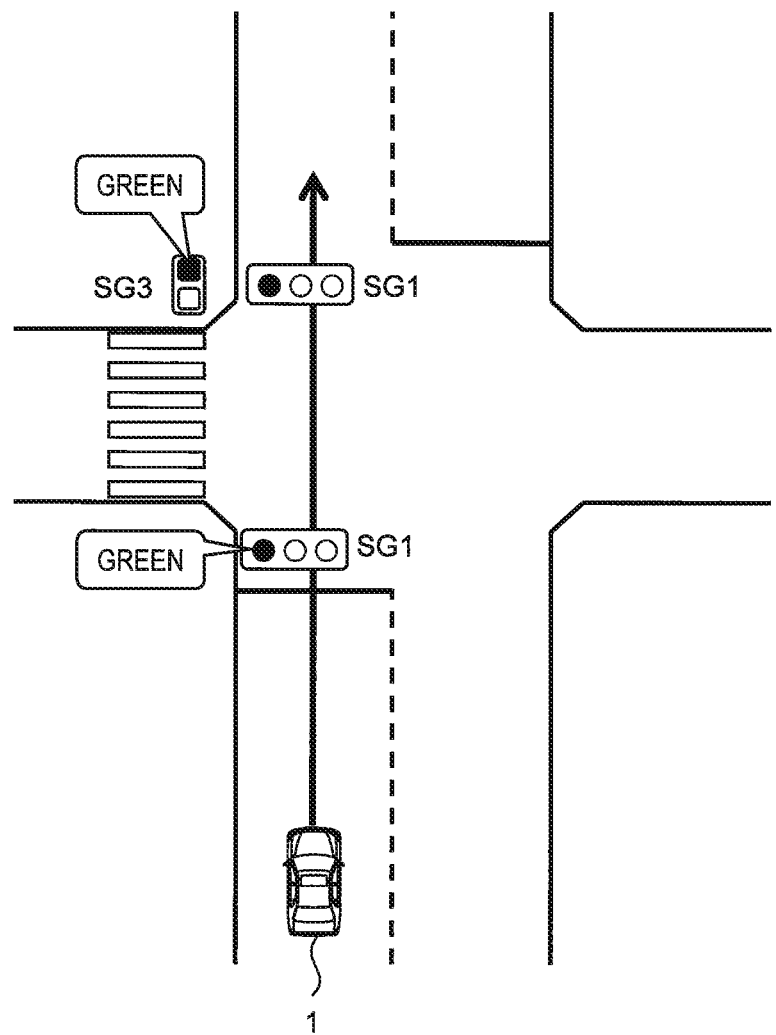
FIG. 18 is a conceptual diagram for explaining a second modification example of the embodiment of the present disclosure.

FIG. 18 is a conceptual diagram for explaining a second modification example of the present embodiment. In the second modification example, we consider a traffic signal for pedestrian. In FIG. 18, a first traffic signal SG1 is a traffic signal for vehicle and corresponds to the traffic signal SG described in the foregoing embodiment. On the other hand, a third traffic signal SG3 is a traffic signal for pedestrian whose orientation is the same as the first traffic signal SG1.

The database management device 30 determines, based on the camera image information 215, a type of the traffic signal SG at the verification position, that is, whether the traffic signal SG at the verification position is the first traffic signal SG1 or the third traffic signal SG3. By analyzing the image imaged by the camera, it is possible to determine the type of the traffic signal SG included in the recognition region ROI.

As another example, the traffic signal map information SG_MAP may include the type of the traffic signal SG as shown in FIG. 19. The type of the traffic signal SG includes the traffic signal for vehicle and the traffic signal for pedestrian. The database management device 30 registers the traffic signal map information SG_MAP indicating the position and type of the recognized traffic signal SG in the map database MAP_DB. Thereafter, the database management device 30 can recognize the type of the registered traffic signal SG by reference to the traffic signal map information SG_MAP.

In Step S300 (see FIG. 13), the database management device 30 recognizes the signal indication of each of the first traffic signal SG1 and the third traffic signal SG3.

In Step S400, the database management device 30 sets the evaluation value P for each of the first traffic signal SG1 and the third traffic signal SG3. In each case, the evaluation value P is set according to whether or not the behavior of the vehicle 1 is consistent with the signal indication. The increase condition and the decrease condition regarding the first traffic signal SG1 are the same as those described in the foregoing embodiment. As for the third traffic signal SG3, an example is as follows.

Every time the vehicle 1 passes through a same intersection, the database management device 30 determines whether or not a consistency condition is satisfied. More specifically, the consistency condition is that the vehicle 1 passes through the intersection while the signal indication of the third traffic signal SG3 indicates "Go permitted (Green)" or the vehicle 1 stops before the intersection while the signal indication of the third traffic signal SG3 indicates "Stop (Red)". The database management device 30 executes a predetermined number of times the determination of whether or not the consistency condition is satisfied, and counts the number of times (the number of consistencies) that the consistency condition is satisfied. The increase condition regarding the third traffic signal SG3 is that the number of consistencies exceeds a threshold. The decrease condition regarding the third traffic signal SG3 is that the increase condition is not satisfied.

Uses of the third traffic signal SG3 in the driving support control are as follows. For example, when detecting that the third traffic signal SG3 (i.e. the traffic signal for pedestrian) changes from Green light to Red light, the driving support control device 100 can predict that the first traffic signal SG1 will change soon. As another example, let us consider a case where the first traffic signal SG1 is shielded by an obstacle (e.g. a tree, another vehicle, etc.) and cannot be seen from the vehicle 1. In that case, the driving support control device 100 determines whether or not to stop the vehicle 1 by using the lighting state of the third traffic signal SG3 as reference.

5-3. Third Modification Example

Figure 20:
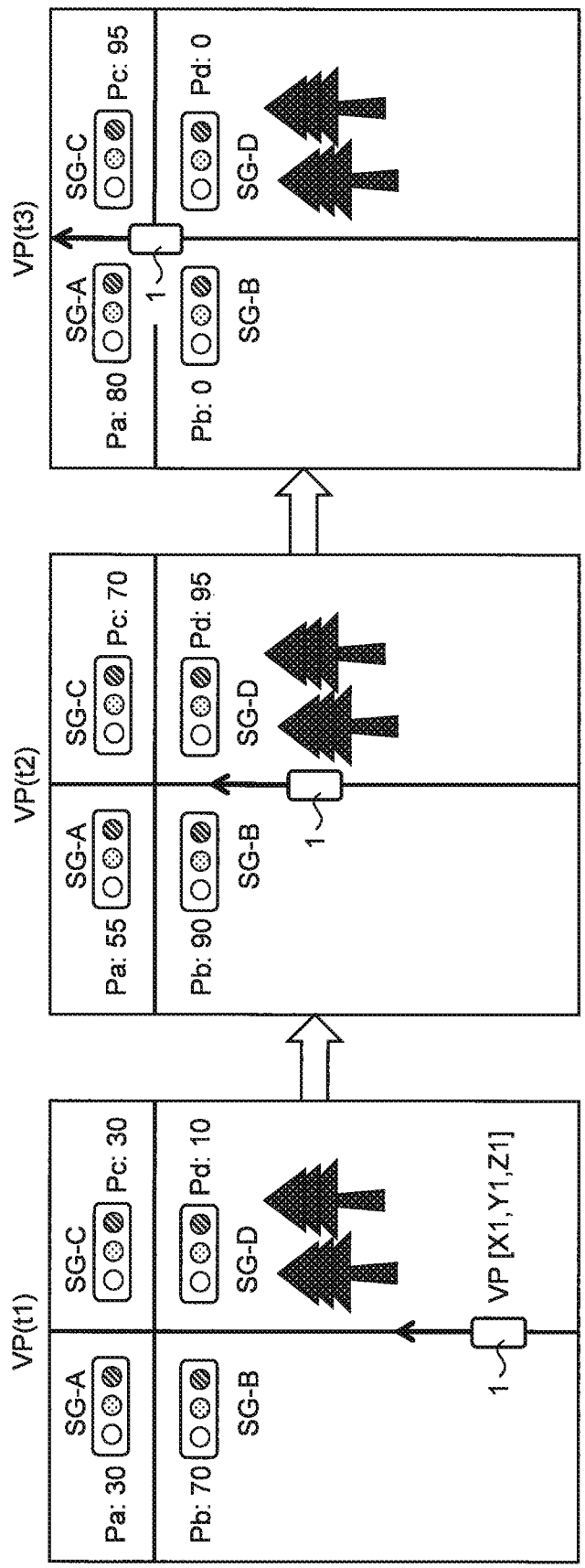
FIG. 20 is a conceptual diagram for explaining a third modification example of the embodiment of the present disclosure.

FIG. 20 is a conceptual diagram for explaining a third modification example of the present embodiment. Four traffic signals SG-A, SG-B, SG-C, and SG-D are installed at a certain intersection. A vehicle position VP [X1, Y1, Z1] is the position (absolute position) of the vehicle 1. Visibility of each traffic signal SG from the vehicle 1 varies depending on the vehicle position VP.

For instance, at a time t1, the traffic signal SG-D is shielded by a tree when viewed from a vehicle position VP(t1). At a time t2, the traffic signal SG-D can be viewed from a vehicle position VP(t2). At a time t3, the vehicle 1 has already passed the positions of the traffic signals SG-B and SG-D, and the traffic signals SG-B and SG-D cannot be viewed from a vehicle position VP(t3).

According to the third modification example, such the change in visibility of the traffic signal SG also is reflected in the evaluation value P regarding the traffic signal SG. That is to say, the evaluation value P regarding the traffic signal SG at a position [X, Y, Z] is given as a function of the vehicle position VP [X1, Y1, Z1]. The evaluation value P for the vehicle position VP is higher as the visibility of the traffic signal SG from the vehicle position VP is higher. Conversely, the evaluation value P for the vehicle position VP is lower as the visibility of the traffic signal SG from the vehicle position VP is lower.

For example, a distance between the vehicle position VP and the position of the traffic signal SG affects the visibility of the traffic signal SG. The evaluation value P for the vehicle position VP is set to be lower as the vehicle position VP is away from the traffic signal SG. As another example, presence of a shielding object between the vehicle position VP and the traffic signal SG affects the visibility of the traffic signal SG. When a shielding object exists between the vehicle position VP and the traffic signal SG, the evaluation value P for the vehicle position VP is set to be lower.

The database management device 30 sets the evaluation value P based both on whether or not the behavior of the vehicle 1 is consistent with the signal indication and on the visibility of the traffic signal SG that depends on the vehicle position VP. For example, the database management device 30 first calculates the evaluation value P and registers the traffic signal map information SG_MAP in the map database MAP_DB in accordance with a basic flow as shown in FIGS. 13 to 15. After that, the database management device 30 calculates the visibility of the traffic signal SG from the vehicle position VP based on the surrounding situation information 210 and the vehicle position information 220, and modifies the evaluation value P according to the visibility.

The driving support control device 100 acquires the evaluation value P regarding each traffic signal SG by using the vehicle position VP indicated by the vehicle position information 220 as a parameter. For example, when a plurality of traffic signals SG are installed at a same intersection, the driving support control device 100 preferentially uses the traffic signal map information SG_MAP having a higher evaluation value P. Since the evaluation value P varies depending on the vehicle position VP, the preferentially-used traffic signal map information SG_MAP also may vary depending on the vehicle position VP.

In the case of the example shown in FIG. 20, a result is as follows. At the time t1, an evaluation value Pb regarding the traffic signal SG-B is the highest, and thus the driving support control device 100 uses the traffic signal map information SG-MAP regarding the traffic signal SG-B. At the time t2, an evaluation value Pd regarding the traffic signal SG-D is the highest, and thus the driving support control device 100 uses the traffic signal map information SG-MAP regarding the traffic signal SG-D. At the time t3, an evaluation value Pc regarding the traffic signal SG-C is the highest, and thus the driving support control device 100 uses the traffic signal map information SG-MAP regarding the traffic signal SG-C.

As described above, when the evaluation value P is given as a function of the vehicle position VP, it is possible to select more appropriate traffic signal map information SG_MAP for the driving support control. As a result, the accuracy of the driving support control using the traffic signal map information SG_MAP is further increased. In other words, the usefulness of the traffic signal map information SG_MAP is further increased.

5-4. Fourth Modification Example

Let us consider update of the evaluation value P of the traffic signal map information SG_MAP that is already registered in the map database MAP_DB. In Step S100 (see FIG. 13), the database management device 30 acquires the position of the traffic signal SG indicated by the traffic signal map information SG_MAP as the verification position. After that, the database management device 30 determines whether or not an "update prohibition condition" is satisfied.

An example of the update prohibition condition is that the traffic signal SG at the verification position is shielded by an obstacle (e.g. another vehicle). For instance, the database management device 30 recognizes another vehicle based on the surrounding situation information 210. When another vehicle overlaps the recognition region ROI, the database management device 30 determines that the traffic signal SG at the verification position is shielded.

Another example of the update prohibition condition is that the vehicle 1 is involved in a traffic jam. The database management device 30 determines whether or not the vehicle 1 is involved in a traffic jam based on the vehicle position information 220 and the delivery information 240 (specifically, the road traffic information). Alternatively, the database management device 30 may determine whether or not the vehicle 1 is involved in a traffic jam based on the surrounding situation information 210 and the vehicle state information 230 (specifically, the vehicle speed).

When the update prohibition condition is satisfied, the database management device 30 prohibits the update of the evaluation value P regarding the traffic signal SG at the verification position. As a result, the accuracy of the evaluation value P is prevented from decreasing needlessly.

5-5. Fifth Modification Example

It is also possible to combine some of the first to fourth modification examples as long as there is no contradiction.

What is claimed is:
1. A map information system comprising:
a database management device configured to manage a map database used for driving support control that supports driving of a vehicle, wherein
the map database includes traffic signal map information that indicates a position of a traffic signal,
the traffic signal map information is associated with an evaluation value that indicates certainty of the traffic signal map information for each traffic signal,
driving environment information indicating driving environment for the vehicle includes:
camera image information indicating an image around the vehicle;
vehicle position information indicating a position of the vehicle; and
vehicle state information indicating a state of the vehicle, and the database management device is further configured to:
　recognize a signal indication of the traffic signal at a verification position, based on the camera image information;
　recognize behavior of the vehicle with respect to the verification position, based on the vehicle state information and the vehicle position information; and
　set the evaluation value regarding the traffic signal at the verification position according to whether or not the behavior of the vehicle is consistent with the signal indication.

2. The map information system according to claim 1, wherein
　an increase condition is that the behavior of the vehicle is consistent with the signal indication,
　a decrease condition is that the behavior of the vehicle is not consistent with the signal indication,
　when the increase condition is satisfied, the database management device increases the evaluation value regarding the traffic signal at the verification position, and
　when the decrease condition is satisfied, the database management device decreases the evaluation value regarding the traffic signal at the verification position.

3. The map information system according to claim 2, wherein
　the increase condition includes that the vehicle passes the verification position while the signal indication indicates go permitted or the vehicle stops before the verification position while the signal indication indicates stop, and
　the decrease condition includes that the vehicle stops before the verification position while the signal indication indicates go permitted or the vehicle passes the verification position while the signal indication indicates stop.

4. The map information system according to claim 2, wherein
　the traffic signal at the verification position is installed at an intersection,
　the increase condition includes that the vehicle passes through the intersection while the signal indication indicates go permitted or the vehicle stops before the intersection while the signal indication indicates stop, and
　the decrease condition includes that the vehicle stops before the intersection while the signal indication indicates go permitted or the vehicle passes through the intersection while the signal indication indicates stop.

5. The map information system according to claim 2, wherein
　the traffic signal includes:
　　a first traffic signal for a first lane in which the vehicle exists; and
　　a second traffic signal for a second lane intersecting with the first lane at an intersection,
　the database management device determines whether the traffic signal at the verification position is the first traffic signal or the second traffic signal based on the vehicle position information and an orientation of the traffic signal at the verification position,
　the increase condition regarding the second traffic signal includes that the vehicle stops before the intersection while the signal indication of the second traffic signal indicates go permitted or the vehicle passes through the intersection while the signal indication of the second traffic signal indicates stop, and
　the decrease condition regarding the second traffic signal includes that the vehicle passes through the intersection while the signal indication of the second traffic signal indicates go permitted or the vehicle stops before the intersection while the signal indication of the second traffic signal indicates stop.

6. The map information system according to claim 1, wherein
　the evaluation value is a function of a vehicle position being the position of the vehicle, and
　the evaluation value for the vehicle position is lower as visibility of the traffic signal from the vehicle position is lower.

7. The map information system according to claim 1, wherein
　the database management device is further configured to repeatedly calculate and update the evaluation value regarding the traffic signal a certain number of times, and then register the traffic signal map information having the evaluation value higher than a threshold in the map database while associating the traffic signal map information with the evaluation value.

8. The map information system according to claim 1, further comprising a driving support control device configured to execute the driving support control based on the driving environment information and the traffic signal map information.

9. A map information system comprising:
　a memory device in which a map database used for driving support control that supports driving of a vehicle is stored; and
　one or more processors, wherein
　the map database includes traffic signal map information that indicates a position of a traffic signal,
　the traffic signal map information is associated with an evaluation value that indicates certainty of the traffic signal map information for each traffic signal,
　driving environment information indicating driving environment for the vehicle includes:
　　camera image information indicating an image around the vehicle;
　　vehicle position information indicating a position of the vehicle; and
　　vehicle state information indicating a state of the vehicle, and
　the one or more processors are configured to:
　　recognize a signal indication of the traffic signal at a verification position, based on the camera image information;
　　recognize behavior of the vehicle with respect to the verification position, based on the vehicle state information and the vehicle position information; and
　　set the evaluation value regarding the traffic signal at the verification position according to whether or not the behavior of the vehicle is consistent with to the signal indication.

\* \* \* \* \*